(12) United States Patent
Gesmann

(10) Patent No.: US 9,686,150 B2
(45) Date of Patent: Jun. 20, 2017

(54) MONITORING SYSTEM AND METHOD FOR MONITORING THE OPERATION OF DISTRIBUTED COMPUTING COMPONENTS

(71) Applicant: SOFTWARE AG, Darmstadt (DE)

(72) Inventor: Michael Gesmann, Darmstadt (DE)

(73) Assignee: SOFTWARE AG, Darmstadt (DE)

( * ) Notice: Subject to any disclaimer, the term of this patent is extended or adjusted under 35 U.S.C. 154(b) by 175 days.

(21) Appl. No.: 13/911,724

(22) Filed: Jun. 6, 2013

(65) Prior Publication Data

US 2014/0337510 A1  Nov. 13, 2014

(30) Foreign Application Priority Data

May 7, 2013 (EP) ..................... 13166758

(51) Int. Cl.
*H04L 29/06* (2006.01)
*H04L 12/24* (2006.01)
*G06F 11/34* (2006.01)

(52) U.S. Cl.
CPC ...... *H04L 41/5009* (2013.01); *G06F 11/3409* (2013.01); *G06F 11/3447* (2013.01); *G06F 11/3466* (2013.01); *G06F 11/3419* (2013.01); *G06F 2201/86* (2013.01); *G06F 2201/865* (2013.01)

(58) Field of Classification Search
CPC ..................................................... H04L 29/06
USPC ........................................................ 709/224
See application file for complete search history.

(56) References Cited

U.S. PATENT DOCUMENTS

| | | | |
|---|---|---|---|
| 7,426,736 B2 | 9/2008 | Cole et al. | |
| 7,457,728 B2 | 11/2008 | Chen et al. | |
| 7,676,461 B2* | 3/2010 | Chkodrov et al. | 707/999.004 |
| 8,572,103 B2* | 10/2013 | Werner | 707/756 |
| 2005/0010456 A1* | 1/2005 | Chang | G06Q 10/063 705/7.38 |
| 2007/0118545 A1 | 5/2007 | Chandrasekharan et al. | |
| 2008/0046266 A1* | 2/2008 | Gudipalley et al. | 705/1 |

(Continued)

OTHER PUBLICATIONS http://docs.oracle.com/cd/E16764_01/doc.1111/e12048/intro.htm ; "Introduction to Oracle CQL", retrieved Jun. 5, 2013.

(Continued)

*Primary Examiner* — Vivek Srivastava
*Assistant Examiner* — Sibte Bukhari
(74) *Attorney, Agent, or Firm* — Nixon & Vanderhye P.C.

(57) ABSTRACT

Certain example embodiments relate to a monitoring system for monitoring the operation of distributed computing components. The monitoring system includes a registry for storing descriptions of the computing components and at least one associated service-level agreement (SLA) specifying at least one performance requirement; a compiler for generating at least one first and second continuous query based on the information stored in the registry; and a complex event processing (CEP) engine for executing the at least one first continuous query on input events indicating actions performed by the computing components and corresponding performance information, and for producing at least one output event indicating a violation of at least one SLA. The CEP engine also executes the at least one second continuous query on input events indicating a violation of at least one SLA, and produces at least one output event indicating a relationship between at least two SLA violations.

15 Claims, 14 Drawing Sheets

(56) References Cited

U.S. PATENT DOCUMENTS

Figure 1:
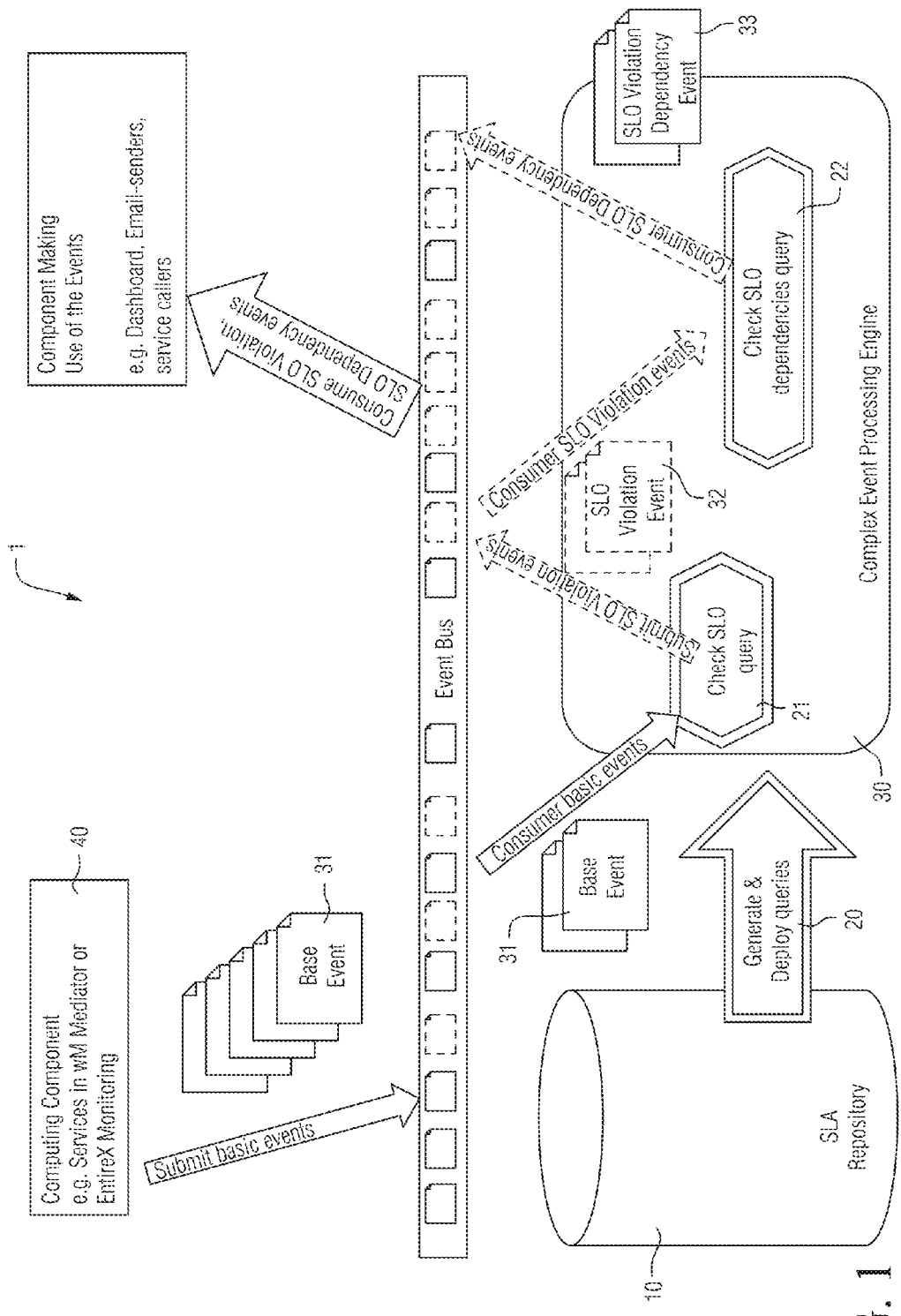

2012/0185877 A1  7/2012  McGuire et al.
2013/0018702 A1  1/2013  Smith et al.

OTHER PUBLICATIONS http://en.wikipedia.org/wiki/Service_level_objective; "Service level objective", retrieved Jun. 5, 2013.

Cicotti, G., et al., "QoS Monitoring in a Cloud Services Environment: The SRT-15 Approach," Euro-Par 2011 Workshops, Part 1, LNCS 7155, pp. 15-24, Aug. 29, 2011 (10 pages).

Weidlich, M, et al., "Event-Based Monitoring of Process Execution Violations," Business Process Management, LNCS 6896, pp. 182-198, Aug. 30, 2011 (17 pages).

Belter, R., et al., "Towards Distributed Management of Service-Oriented Computing Infrastructures," Computer Software and Applications, IEEE, pp. 1029-1034, Jul. 28, 2008 (6 pages).

Balis, B. et al., "On-Line Monitoring of Service-Level Agreements in the Grid," Euro-Par 2011 Workshops, Part II, LNCS 7156, pp. 76-85, Aug. 29, 2011, (10 pages).

Baouab, A., et al., "An Optimized Derivation of Even Queries to Monitor Choreography Violations," ICSOC 2012, LNCS 7636, pp. 222-236, Nov. 12, 2012 (15 pages).

European Search Report issued in Application Serial No. 13166758 dated Nov. 25, 2013 (8 pages).

\* cited by examiner

| §software™ | CentraSite™ ActiveSOA | | | | | |
|---|---|---|---|---|---|---|
| Home ▼ | Asset Catalog ▼ | Policies ▼ | Administration ▼ | Reports ▼ | | Operations▼ |
| Organizations | Users ▼ | Types ▼ | Taxonomies | UDDI Subscriptions | Logs ▼ | Lifecycles ▼ |

Taxonomies

[ Add Taxonomy... ] [ Delete ]  ☐ Show all Taxonomies

| Taxonomies | Description |
|---|---|
| ▼ ☐ SLA - Aggregation Basis | The way the recent events are selected, e.g., all from the last 25 minutes or the 10 most recent events. |
| ☐ Number of events | Select a fixed number of recent events. |
| ☐ Time interval in minutes | Select the events from the recent time interval. |
| ▼ ☐ ⊙ SLA - Key Performance Indicators | An indicator for the performance of a certain property of a virtual service, e.g. response time. |
| ☐ Availability in % | A KPI to measure the availability as the sum of successful and of non-successful divided by the total num |
| ☐ Processing Time in ms | A KPI that approximates the processing time of the service as the RTT between the proxy and the servic |
| ☐ Reliability in % | A KPI to measure the reliability as the number of successful requests divided by the sum of successful an |
| ☐ Response Time in ms | A KPI that approximates the response time of the service as the RTT between the consumer and the ser |
| ☐ Throughput in # Transactions | A KPI to measure the throughput as the amount of requests per measured interval. |
| ▼ ☐ SLA - Log Output Type | The file type that the policy writes log information to. |
| ☐ CommaSeparatedValues | |
| ☐ Excel | |
| ☐ Plaintext | |
| ▼ ☐ SLA - Metrics | Metrics to compare the KPIs output with the SLOs, e.g. single comparison, moving average. |
| ☐ Exponentially Weighted Moving Average | Calculate an average where new events are weighted stronger in an exponentially decreasing fashion. T |
| ☐ Linearly Weighted Moving Average | Calculate an average where new events are weighted stronger in a linearly decreasing fashion. The weig |
| ☐ Single Comparison | Compare every event separately with SLO. |
| ☐ Uniformly Weighted Moving Average | Calculate an average where every event is weighted equally. |
| ▼ ☐ SLA - SLO Operators | Operators to compare a key performance indicator with a threshold defined by a service level objective. |
| ☐ greater or equal | |
| ☐ greater than | |
| ☐ less or equal | |
| ☐ less than | |
| ▼ ☐ SLA Lifecycle | |
| ☐ Draft | |
| ☐ Productive | |
| ☐ Retired | |

— 50

FIG. 6

| $software^{AG}$ | CentraSite™ ActiveSOA | | | | | |
|---|---|---|---|---|---|---|
| Home ▼ | Asset Catalog ▼ | Policies ▼ | Administration ▼ | Reports ▼ | Operations ▼ | |

Browse | Search | Supporting Documents

Service Level Agreement

Name: SoftwareAG-ConferenceService-GoldLevel
Description: Agreement between Software AG and ConferenceTours.
Service reply on average over 10 calls in less then 10ms.
Services are available at least 95% in 30 minutes time frames
Version: 1.0

Created: 2013-03-04 01:21 PM
Last Modified: 2013-03-04 01:21 PM
Lifecycle State: Draft
Organization: Default Organization
Owner: INTERNAL\Administrator   Default Organization SLOs | Actions | Services | Classifications | Associations

| Attribute | Value(s) | Action |
|---|---|---|
| SLOs: | Response Time < 10ms 1.0 – Service Level Objective | Modify... |
| | ServiceAvailability > 95 percent 1.0 – Service Level Objective | Modify... |
| Consumers: | SoftwareAG 1.0 – Application | Modify... |

| §software™ | CentraSite™ ActiveSOA | | | | |
|---|---|---|---|---|---|
| Home ▼ | Asset Catalog ▼ | Policies ▼ | Administration ▼ | Reports ▼ | Operations ▼ |

Browse | Search | Supporting Documents

Name: Response Time < 100ms Query
Description: Event Query for SLO Response Time < 100ms
Version: 1.0

Created: 2013-03-12 05:34 PM
Last Modified: 2013-03-12 05:34 PM
Organization: Default Organization
Owner: INTERNAL\Administrator

Event Query
Query | Associations

| Attribute | Value(s) |
|---|---|
| *Query: | SELECT 'uddi:45458582-774d-11e2-a58f-9ffbc023945e' AS slaKey, 'SAG-ConferenceTravel-Gold' AS slaName, 'uddi:0c4224b2-774c-11e2-a58f-c1a8455caa27' AS sloKey, 'Response Tie < 100ms AS sloName, sub.kpiValue AS kpiValue, sub.subjectKey AS subjectKey, 'BookConference-Conference-Tours' AS subjectName, sub.consumerName AS consumerName, sub.startTimestamp AS startTimestamp, sub.endTimestamp AS endTimestamp, "Details$Consumer" AS consumerName, "BasicRuntimeEvent$ServiceKey" AS subjectKey, MAX(infoQ.endTimestamp) AS endTimestamp, MIN(infoQ.startTimestamp) AS startTimestamp, MAX(infoQ.endTimestamp) AS endTimestamp, (SUM(UDF_uniformWeighting('Details$TotalRoundTripTime', "BasicRuntimeEvent$Timestamp", infoQ.startTimestamp, infoQ.endTimestamp, infoQ.numEvents)) / MIN(UDF_uniformWeightingDenominator(infoQ.numEvents))) AS kpiValue FROM UDC_SLAEvents(MediatorTransactionEvents, 'BasicRuntimeEvent$ServiceKey', 'Details$Consumer', "Details$Consumer" AS consumerName, COUNT(*), 1), (SELECT "BasicRuntimeEvent$ServiceKey" AS subjectKey, "Details$Consumer" AS consumerName, COUNT(*) AS numEvents, MIN("BasicRuntimeEvent$Timestamp") AS startTimestamp, MAX("BasicRuntimeEvent$Timestamp") AS endTimestamp FROM UDO_SLAEvents(MediatorTransactionEvents, "BasicRuntimeEvent$ServiceKey", "Details$Consumer", "BasicRuntimeEvent$Timestamp", 'count', 1) GROUP BY "BasicRuntimeEvent$ServiceKey", "Details$Consumer") AS sub WHERE "BasicRuntimeEvent$ServiceKey" = infoQ.subjectKey AND "Details$Consumer" = infoQ.consumerName GROUP BY "BasicRuntimeEvent$ServiceKey", "Details$Consumer") AS sub WHERE sub.kpiValue IS NOT NULL AND sub.startTimestamp IS NOT NULL AND sub.endTimestamp IS NOT NULL AND sub.subjectKey = 'uddi:33ffb07a-112c-11e2-b4b0-9c3456018bd7' AND sub.consumerName = 'SoftwareAG' AND NOT sub.kpiValue < 100.0 ; | deployedTo: Default Event Server 1.0 - Event Query Engine
HasInput: Transaction Event 1.0 - EventType
HasOutput: SLOViolation 1.0 - EventType

FIG. 13

FIG. 14

MONITORING SYSTEM AND METHOD FOR MONITORING THE OPERATION OF DISTRIBUTED COMPUTING COMPONENTS

This application claims priority to EP 13 166 758.6 filed 7 May 2013, the entire contents of which is hereby incorporated by reference.

1. Technical Field

Certain example embodiments relate to a monitoring system and a corresponding method for monitoring the operation of distributed interconnected computing components.

2. Background and Summary

Complex technical systems are nowadays typically implemented in a distributed fashion, i.e. such systems comprise a plurality of individual computing components which are interacting. In case of physically distributed systems, the computing components typically interact over networks, such as the Internet, while in case of logically distributed systems, the computing components might be located on the same physical hardware (e.g. multiple processes running on one computer). In both cases, each computing component is responsible for the computation of a certain sub-task in order to jointly accomplish an overall task or process.

For example, a typical system adhering to the service-oriented architecture (SOA) paradigm may encompass thousands of individual services, i.e. applications running on a certain computer which are accessible via well-defined interfaces, wherein the services call each other during runtime to achieve the overall computing task. A SOA-based system may also be understood as "pull" oriented architecture, i.e. each participant requests the information/services it requires.

Another fundamentally different approach is a "push" oriented architecture, which has been developed in recent years for tackling the complexity of large systems. This type of architecture is driven by (complex) events, i.e. each computing component may issue events that indicate actions performed by the computing component, and other computing components can consume said events.

Further, it is known to define quality standards to be met by said computer systems or their components, respectively, in so-called service level agreements (SLAs). SLAs can be understood as negotiated agreements between two parties, namely the consumer and provider and are typically enforced by measuring runtime values (so-called key performance indicators (KPIs)) and comparing the measured values with values specified in the SLAs. SLAs may thus be used to define technical performance requirements to be met by the distributed computing components, such as a maximum response time in milliseconds, or a certain minimum throughput to be guaranteed, thereby defining operational requirements which have to be met to ensure a proper operation of the underlying computing system. Whenever the SLA is violated, e.g. when the measured response time exceeds a threshold defined in the associated SLA, an SLA violation can be detected and an according SLA violation event can be generated.

Those skilled in the art will appreciate that controlling and detecting SLA violations in the operation of a system comprising a plurality of distributed computing components is a complex and difficult task. Detecting and reacting to SLA violations and associated failures of computing components and their actions is essential to allow for a correctly performing system and the achievement of the overall computing task/process.

One technique for the monitoring and processing of events is commonly known under the term complex event processing (CEP). CEP introduces several important paradigm changes with respect to classical data processing technologies, where the data is relatively static and various queries can be formulated in order to retrieve the desired data. In CEP, however, the queries are comparatively fixed and fed with continuously arriving streams of data (input events). CEP queries (also referred to as "continuous queries") typically correlate multiple input data items, look for patterns and produce output events in the form of alerts, error messages, or the like. These output events then can trigger further actions when a certain pattern is observed.

In summary, CEP applications have to deal with highly transient event data. This event data continuously arrives in CEP engines at a very high rate, and these engines have to produce the corresponding output events/alerts as soon as possible, ideally nearly in real-time. This includes push-based processing (also known as data driven processing) within main memory, which denotes a data flow approach where data to process is not requested (pulled) by the processing operator on demand or using certain scheduling techniques, but is directly provided (pushed) to the processing operator when it becomes available. The U.S. Pat. No. 7,676,461 B2 and U.S. Pat. No. 7,457,728 B2 provide further background information about complex event processing (CEP).

Therefore, various approaches have been proposed, aiming at the solution of distinct technical problems on the basis of CEP, as summarized in the following. Particularly, the document "Domain specific reference models for event patterns—for faster developing of business activity monitoring applications" of Ammon et al. discloses the complex event processing (CEP) technology as an important tool for Business Process Management (BPM) and real-time Business Activity Monitoring (BAM). The basic idea is the detection of event patterns in an event cloud or event streams. The document further addresses the need for domain specific reference models for required event patterns. For example, the project DoReMoPat aims at the development and implementation of a catalogue of reference models for selected domains, such as automotive, as customizable prototypes.

US patent application publication no. 2007/0118545 A1 proposes an enterprise application integration broker for managing a plurality of applications. Said enterprise application integration broker comprises a complex event processing engine which allows for processing events in at least one of the applications.

US patent application publication no. 2013/0018702 A1 relates to the integration of enterprise business infrastructures systems, such as business event processing systems and business visibility systems in a response process management platform for improved interaction and communication in-between the individual systems. For example, the business event processing system interacts with the business visibility system for the identification of events that should initiate a process or advance a workstep in a process. Further, policies, such as SLAs, are introduced in that these policies can be applied to the enterprise business infrastructure elements that are discovered by the business visibility platform.

US patent application publication no. 2012/0185877 A1 of applicant concerns an application integration system and technique built around the publish-and-subscribe model. Said system comprises several components, such as a process engine, that is responsible for managing/monitoring the run-time execution of end-to-end business processes.

U.S. Pat. No. 7,426,736 B2 discloses an approach for end-to-end management of business systems. This approach comprises the concept of monitoring, detecting and managing of events.

However, the above-summarized monitoring approaches have a number of drawbacks. For example, although event-based technology is capable of monitoring the performance of individual components of a distributed system and alerting in case of performance issues, it is typically left to the user to properly interpret the provided output events, i.e. to find the root cause of the performance issue. This is particularly difficult in distributed systems, since an SLA violation detected for a first component may actually be caused by a violation of a second related component (such as a component which is called by the first component). The known techniques do not allow to relate such individual violations in a manner that would allow to efficiently investigate the root cause of the performance issue. In any case, in the known event-based techniques it is generally up to the user to formulate appropriate queries to be processed by the CEP engine, which is very difficult, so that violations may be easily overlooked and not detected by the prior art systems.

It is therefore the technical problem underlying certain example embodiments to provide a system and method for monitoring the operation of distributed computing components in such a manner that SLA violations can be efficiently and reliably detected, thereby at least partly overcoming the above explained disadvantages of the prior art.

This problem is according to one aspect solved by a monitoring system for monitoring the operation of a plurality of distributed computing components. In the embodiment of claim 1, the monitoring system comprises:
a. a registry, adapted for storing descriptions of the plurality of computing components and at least one associated service-level agreement, SLA, specifying at least one performance requirement;
b. a compiler, adapted for generating at least one first and second continuous query based on the information stored in the registry; and
c. a complex event processing, CEP, engine, adapted for executing the at least one first continuous query on input events indicating actions performed by the plurality of computing components and corresponding performance information, and for producing at least one output event indicating a violation of at least one SLA;
d. wherein the CEP engine is further adapted for executing the at least one second continuous query on input events indicating a violation of at least one SLA, and for producing at least one output event indicating a relationship between at least two SLA violations.

Accordingly, the embodiment defines a monitoring system for enabling an efficient control over the behavior of a plurality of (physically or logically) distributed computing components. The monitoring system's registry is responsible for storing descriptions of the monitored computing components, as well as associated service-level agreements (SLAs), preferably in a descriptive format, such as XML. The SLAs, as mentioned above, correspond to negotiated agreements between service provider and consumer and define performance requirements, which must be fulfilled according to the negotiation.

By means of the monitoring system's compiler, certain example embodiments provide for a translation of the information stored in the registry into one or more continuous queries (also referred to herein as "event queries") which can be executed by a CEP engine to detect SLA violations. In this context, the term compiler is to be understood as any means for parsing the information in the registry (which may be created by a user using a meta description format and a graphical user interface) and for generating the appropriate event queries. More specifically, a first type of event query (also referred to as "Check SLO query" hereinafter) takes as input events which indicate actions performed by the monitored computing components and outputs events which indicate violations of the respective SLA(s). Importantly, also event queries of a second type (also referred to as "Check SLO dependencies query" hereinafter) are generated in such a manner that they operate on the events produced by the first type of query and output events which can indicate a correlation between SLA violations of at least two computing components. In other words, certain example embodiments allow for the correlation of individual SLA violation events, so that root causes for SLA violations can be detected easily and effectively immediately (in real-time). Since the generation of the event query/queries is based on descriptions taken from the registry, no manual definition of such queries is necessary anymore. As a result, the user does not have to deal with complicated event query language (EQL) details and event semantics. Further, since (preferably) based on dependencies between the computing components defined in the stored descriptions in the registry, the queries automatically correlate SLA violations and the output events of the CEP engine comprise information about root causes which users do no longer need to search on their own.

In one aspect, the descriptions of the plurality of computing components in the registry comprise relationship information indicating a dependency between two computing components, i.e. between a calling component and a provider component. Accordingly, based on the information that there is a dependency between two computing components reflected in the registry, the generated event query can directly evaluate this dependency (which is called a "hard relationship" hereinafter). In the other case, i.e. when a computing component is only loosely related to another component, such a relationship may not be evaluated based on information stored in the registry, but e.g. based on overlapping executions times (hereinafter referred to as "loose relationship").

In other words, the registry content prescribes what type of query has to be generated, wherein the registry content knows about the structure of the events and of the relationships, i.e. it knows if a relationship is a hard or a loose one. The generated query can then take this into account and directly evaluate that dependency based on the information coming with the events.

In this context, "hard relationship" means that the events provide sufficient information to unambiguously relate a performance event of the consumer component with a performance event of the provider component so that requests to both can be correlated. As an example based on the running example presented further below, "bookFlight" performance events may contain information to correlate it with "checkPayment" performance events based on the information in the events, as described in the "PayloadIdentification" entry in the "Calls" entry in the "Service" description (see detailed description below). A relationship is referred to as a "loose relationship" when there is no such information in the performance events. In the example, "bookFlight" calls "FlightTicketDB" but there is no such information on how to correlate individual calls. Even in case of a hard relationship, not all SLAB/SLOB maintain that unambiguous correlation. As soon as the SLA/SLO prescribes an aggregation of multiple performance event data into a single aggregated KPI value the unambiguity is lost, which is called a "hard relationship with weak indication". In the example presented further below, "SLA1" aggregates over a 10 minutes time interval. In case of an SLA violation, there is not a single call which can be correlated with calls to the "checkPayment" service. If there is no such aggregation and if it is a hard relationship, then we can identify an SLA/SLO violation of a single call to the provider as a root cause for the consumer's SLA/SLO violation, which is called a strong indication. In the example further below, "bookFlight" "SLA5" is on single calls, it calls "checkPayment", which is also on single calls, so that based on information from events we can correlate these events unambiguously.

Accordingly, in another aspect, the at least one associated SLA specifies at least one performance requirement for a single call of the associated computing component and the at least one output event of the first continuous query indicates an individual call which caused the SLA violation. Accordingly, the SLA in this aspect comprises a performance requirement of a single call, e.g. the SLA may specify that each individual call to a component must be processed within a predefined response time. If such an SLA is violated, the output event produced by the event query indicates the according violation of the single call ("strong indication").

In a further aspect, the at least one associated SLA specifies at least one performance requirement for multiple calls of the associated computing component and the at least one output event of the first continuous query indicates the related SLA violation. Accordingly, contrary to considering just one call in certain situations it might be required to regard multiple calls, e.g. to define in an SLA that a computing component must respond to calls within less than 100 milliseconds on average over a 10 minutes interval. Violations of such SLAs cannot be boiled down to a single call, so that the event query indicates the observation that the SLA was violated by a certain computing component, but not indicating the individual call that led to the violation (so-called "weak indication"). Apparently, the inventive system may allow for defining several SLAs with a mixture of the above-explained types.

Generally, the at least one performance requirement defined in the SLA(s) may be selected from the group comprising: response time, availability, processing time, reliability, throughput and/or any other relevant performance characteristic. Further examples for performance criteria include e.g. number of disk I/Os. Generally, the type of information used in this aspect depends on (a) the information delivered by the computing component, and/or (b) the taxonomies which describe the criteria that can be used.

In yet another aspect, the at least one output event of the first continuous query and/or the at least one output event of the second continuous query comprises data about the time when the violation was detected and/or which violation occurred and/or measured values. Accordingly, the generated output event indicating a violation of at least one SLA can comprise detailed information, such as measured values, namely the distinct measurements of the performance requirements as SLA-Key Performance Indicators (KPIs).

In a further aspect, the at least one computing component is a service, a web service, an infrastructure component and/or a database. Further examples include without limitation a SAP system, a CRM system, an event bus, etc. Accordingly, the computing components monitored by certain example embodiments are not restricted to one single type of components, such as VirtualServices, as one advantage over prior art.

The combination of distinct types of computing components achieves an increase in alternative actions in one system and the detection of associated occurring SLA violations by the claimed system components.

In a further aspect, the compiler is adapted for generating the at least one first and/or second continuous query when a lifecycle state of at least one associated SLA is set to productive. Accordingly, the generation of the at least one continuous query (event query) can be triggered automatically on distinct request options. As one option the SLA in the SLA registry can comprise a lifecycle state. The lifecycle state can be set e.g. to "draft", "productive" and/or "retired". In case of SLA activation, the lifecycle state changes from "draft" to "productive" and the generation of the corresponding query for the SLA is triggered and the generated query is preferably automatically deployed to the CEP engine. Likewise, when a productive SLA is set to "retired", the corresponding event query may be automatically undeployed from the CEP engine.

In another aspect, each SLA comprises one or more service level objectives, SLO, and wherein the compiler is adapted for generating a continuous query for each SLO. Accordingly, each SLA can comprise one or multiple SLOs, wherein the SLO structure implements the individual performance requirements.

In a further aspect, the at least one SLA specifies at least one required action to be performed upon detection of an SLA violation. Accordingly, the system as explained so far allows for monitoring and detecting SLA violations in an efficient manner. When an SLA violation is detected, the system further allows to react according to the explicit situational SLA violation. More particularly, an action can be performed as reaction, for example the sending of emails with a notice about the details and recommendation about the handling of the SLA violations and/or the call of other computation components e.g. to directly solve the SLA violations in firing an explicit repair action. Hence, the system additionally provides further computing components externally or internally to the system for SLA violation solutions. To this end, computing components may register with the system in order to be fed with events and to execute the required action(s) accordingly.

In a further embodiment, the monitoring system also comprises a graphical user interface, adapted for enabling a user to modify the information stored in the registry. Accordingly, the graphical user interface allows for a user friendly handling, manipulation and execution of the proposed monitoring system. The user e.g. does not have to understand the underlying implementation details of the generated event queries, thereby enabling an easy, efficient and automated usage. The graphical user interface further provides detailed information to the user about what is going on in the system, wherein the information comprises e.g. KPI details (metrics, operators, threshold) and generated SLA queries.

Certain example embodiments are also directed to a method for monitoring the operation of a plurality of distributed computing components, wherein the method comprises:

a. storing descriptions of the plurality of computing components and at least one associated service-level agreement, SLA, specifying at least one performance requirement;

b. generating at least one first and second continuous query based on the information stored in the registry;

c. executing the at least one first continuous query on input events indicating actions performed by the plurality of computing components and corresponding performance information, and for producing at least one output event indicating a violation of at least one SLA; and d. executing the at least one second continuous query on input events indicating a violation of at least one SLA, and producing at least one output event indicating a relationship between at least two SLA violations.

Further advantageous embodiments are defined in further dependent claims. Lastly, certain example embodiments provide a computer program comprising instructions for implementing any of the above described methods.

3. BRIEF DESCRIPTION OF THE DRAWINGS

In the following detailed description, presently preferred embodiments are further described with reference to the following figures:

FIG. 1: A schematic representation of a simplified monitoring system, comprising a SLA registry and CEP engine in accordance with one embodiment.

Figure 2:
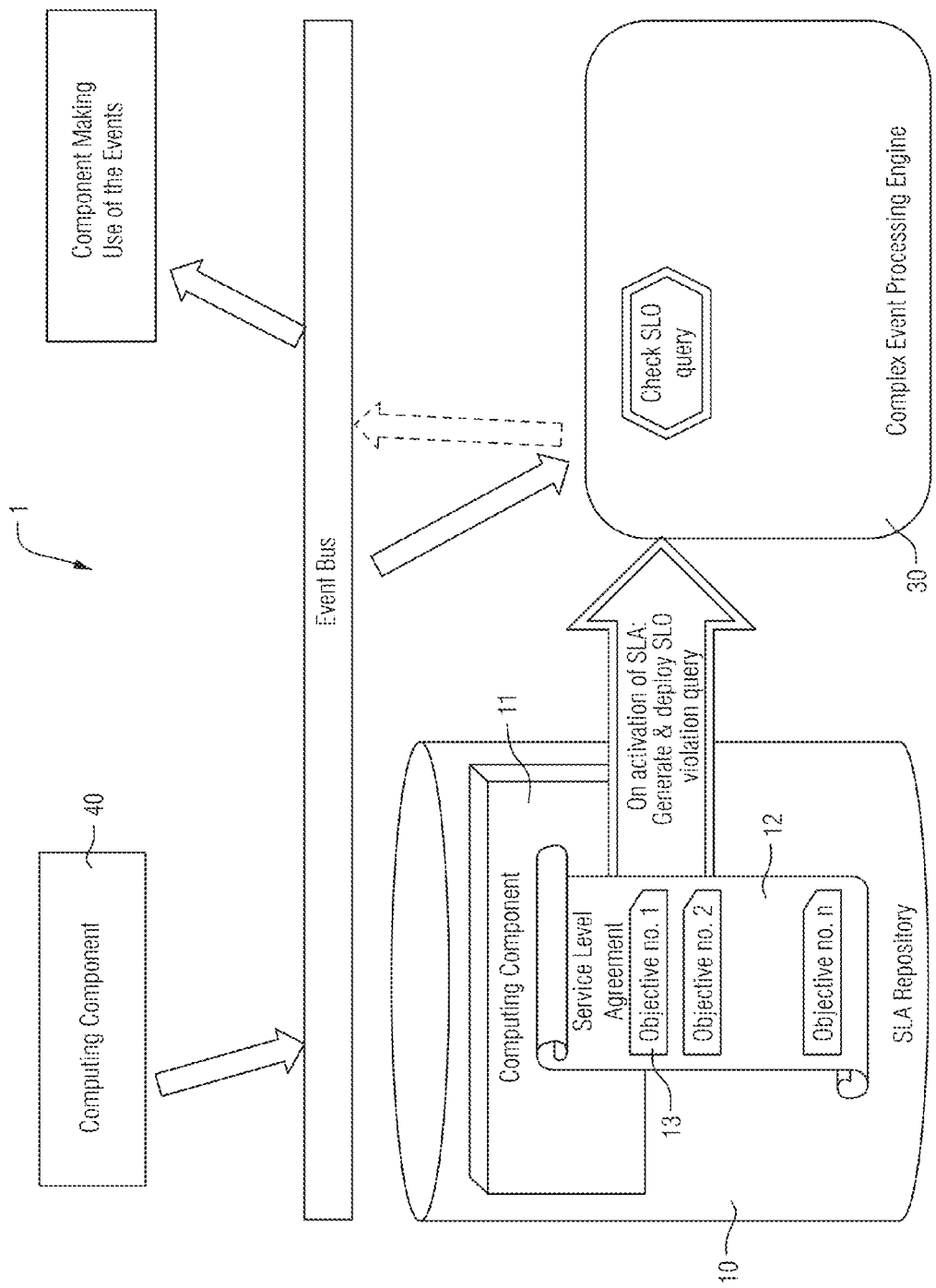

FIG. 2: A schematic diagram illustrating a simplified monitoring system, highlighting a computing component with a SLA in the SLA registry in accordance with one embodiment.

Figure 3:
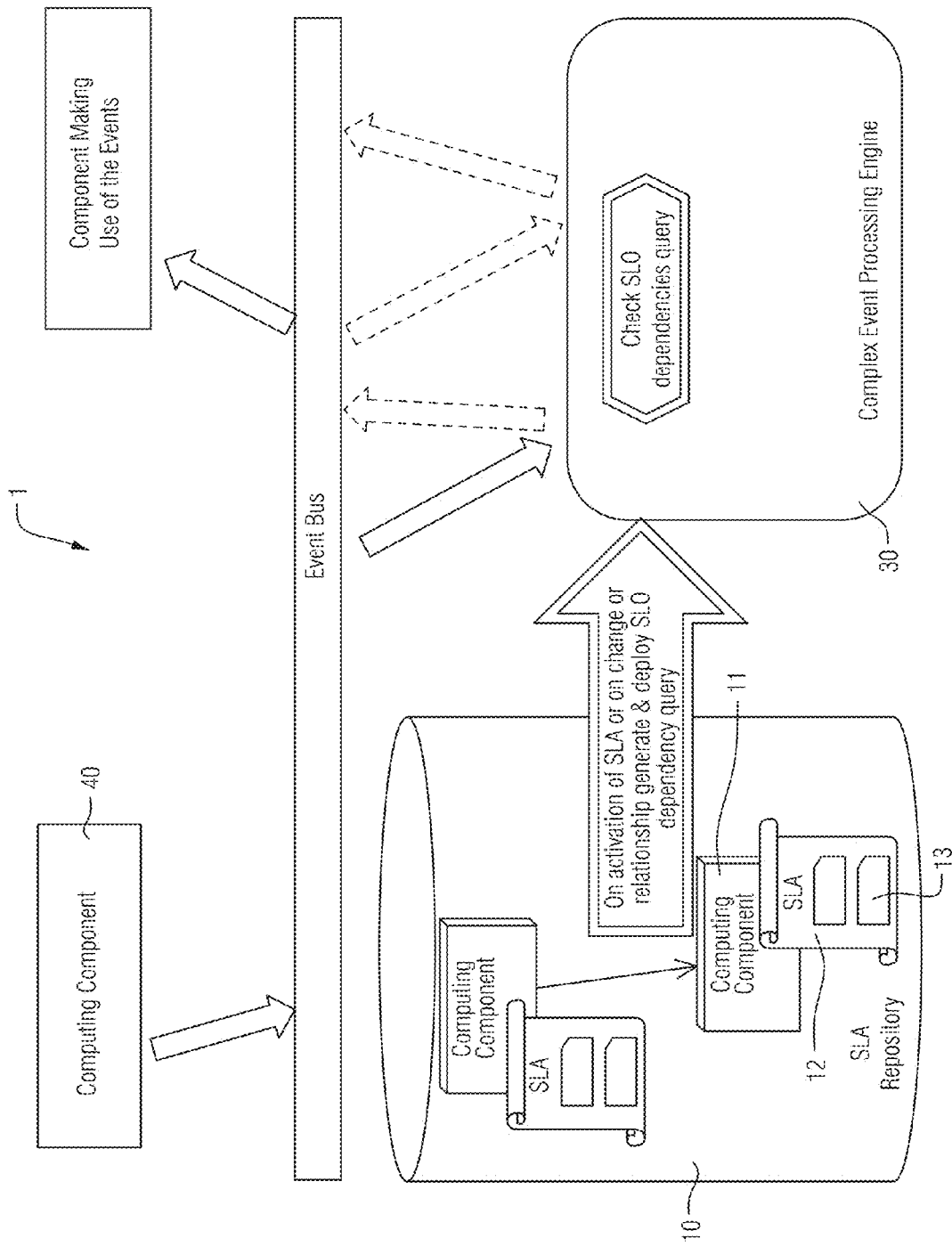

FIG. 3: A schematic diagram illustrating a simplified monitoring system, highlighting dependencies between computing components in the SLA registry in accordance with one embodiment.

Figure 4:
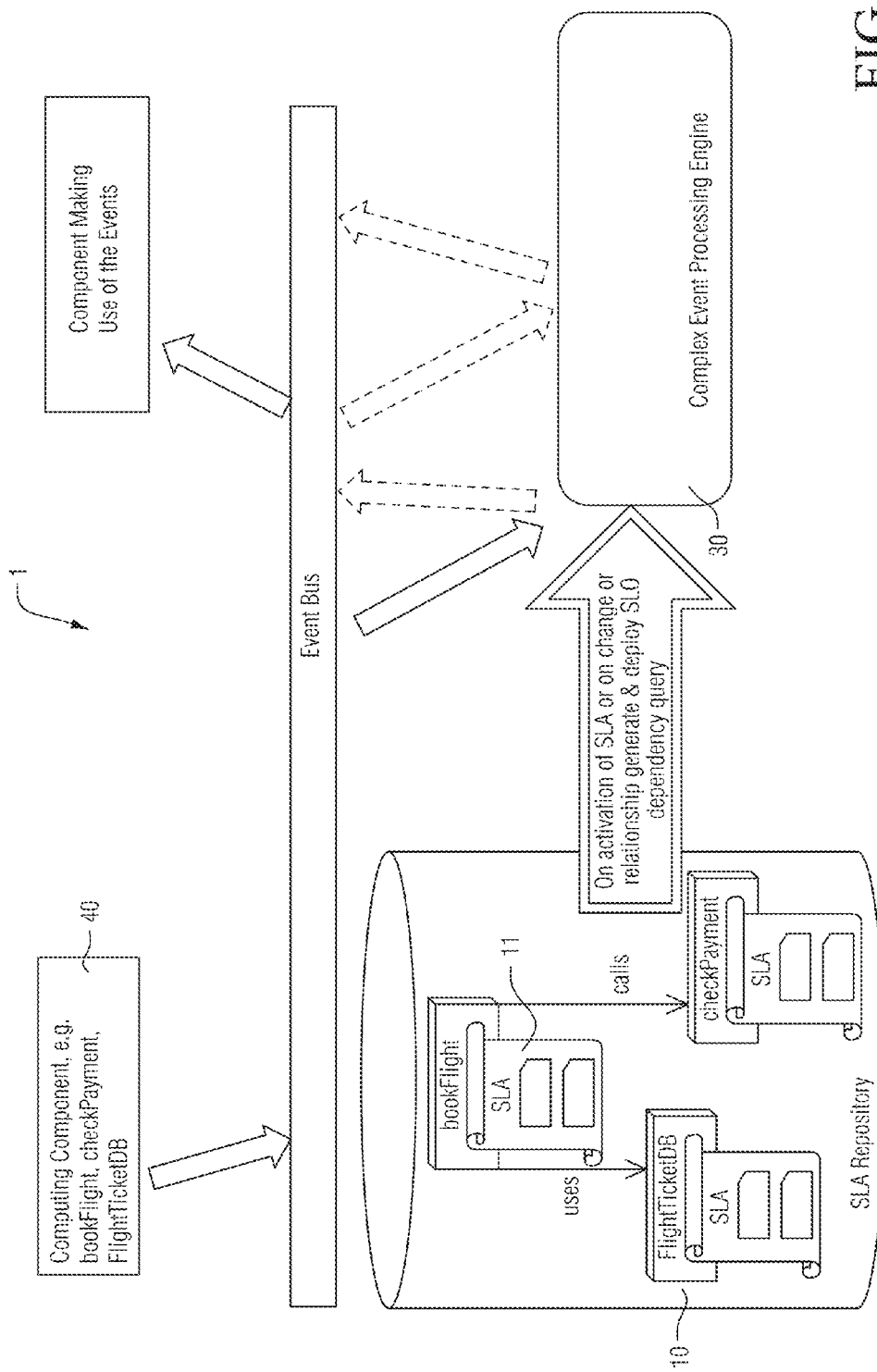

FIG. 4: An illustration of a simplified monitoring system, highlighting the actions and dependencies of a plurality of computing components in accordance with one embodiment.

Figure 5:
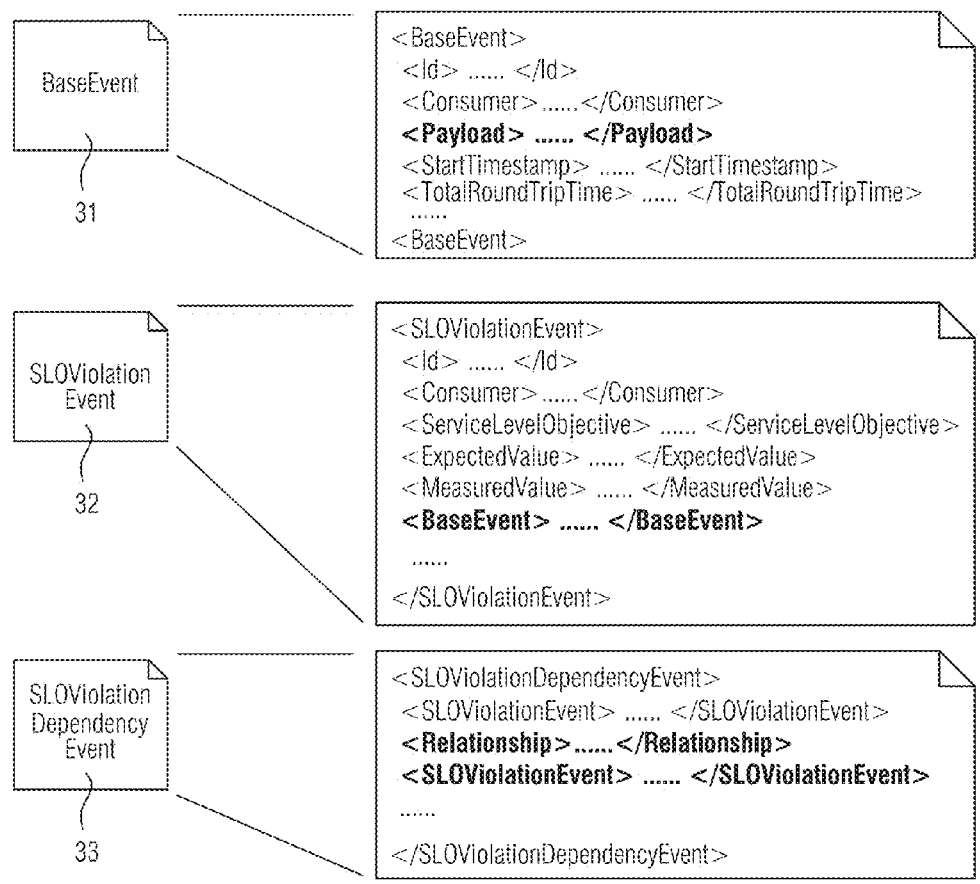

FIG. 5: An exemplary schema of distinct event types in accordance with one embodiment.

FIG. 6: A schematic illustration of a graphical user interface with taxonomies in accordance with one embodiment.

FIG. 7: A schematic illustration of a graphical user interface with two SLOs in accordance with one embodiment.

Figure 8:
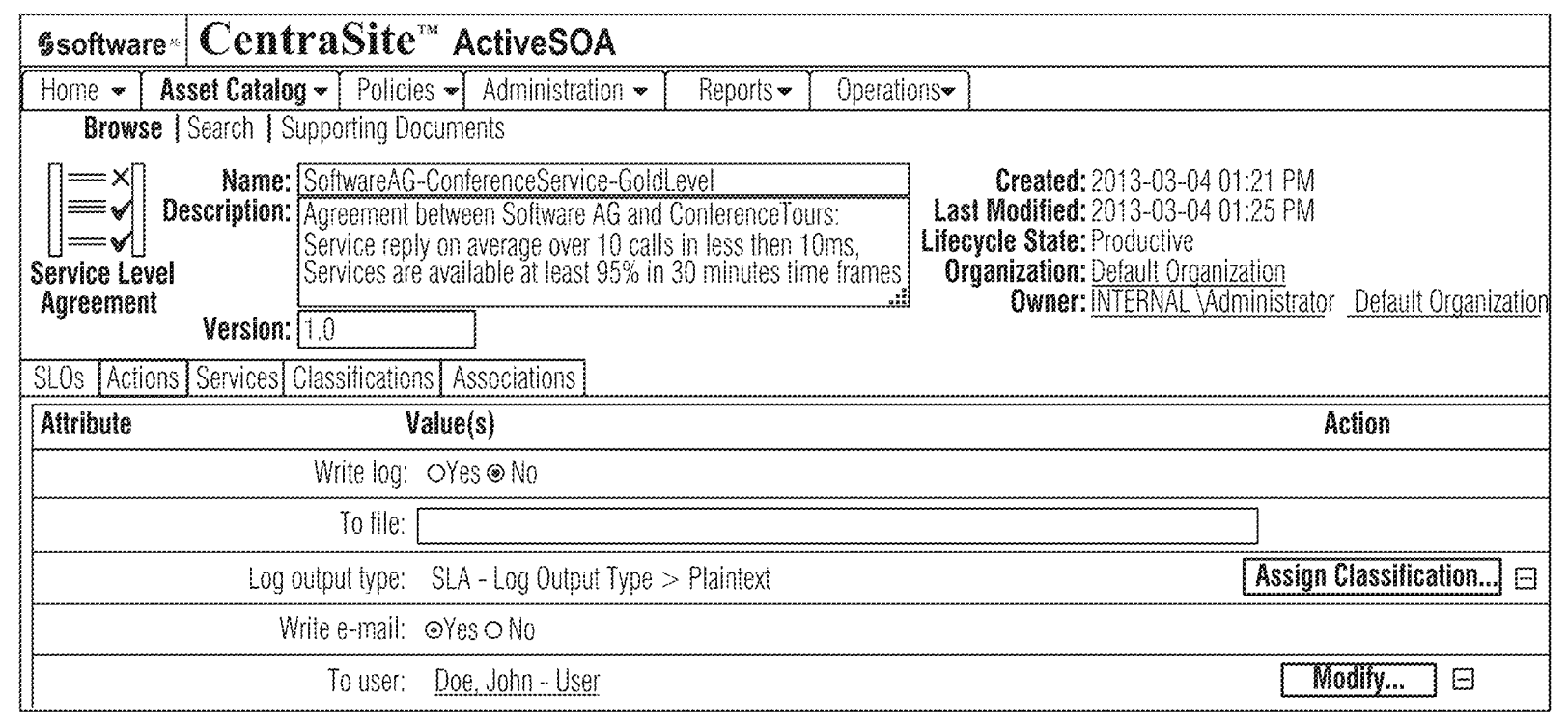

FIG. 8: A schematic illustration of a graphical user interface with actions in accordance with one embodiment.

Figure 9:
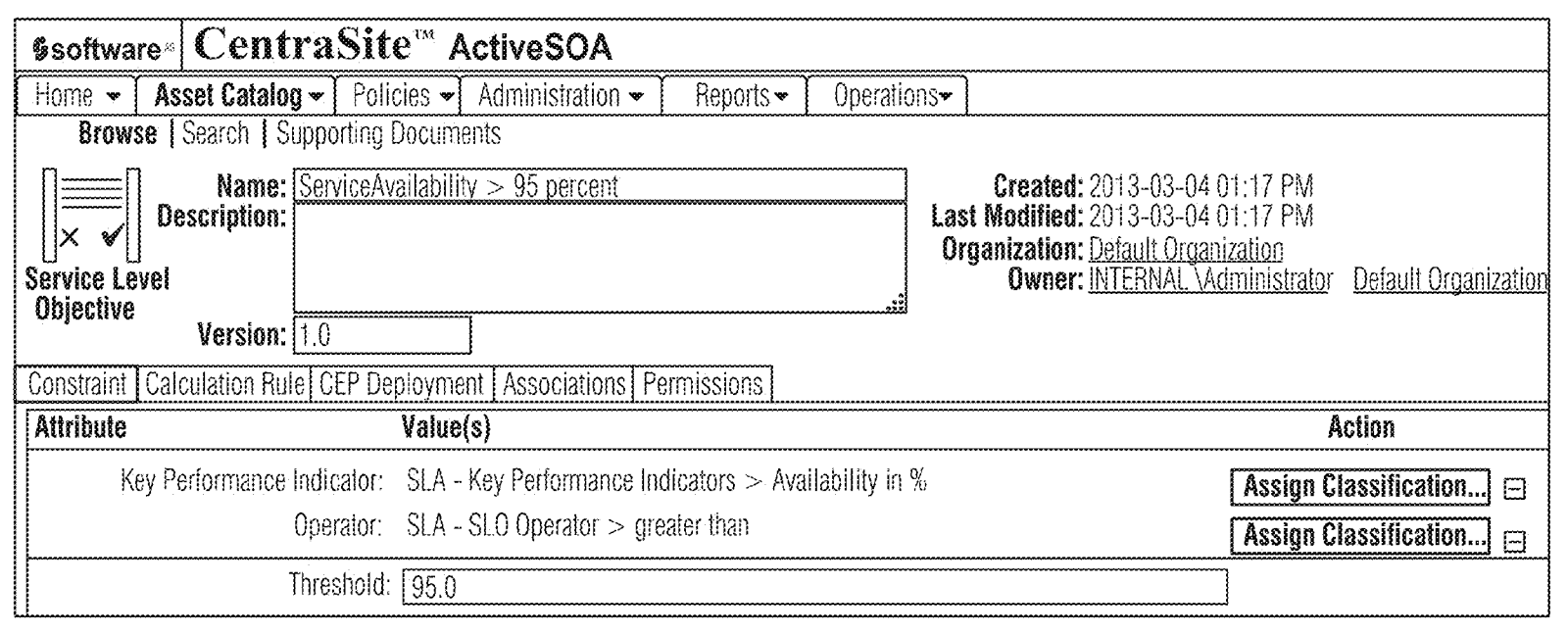

FIG. 9: A schematic illustration of a graphical user interface with detailed information about performance requirements of one of the SLOs in accordance with one embodiment.

Figure 10:
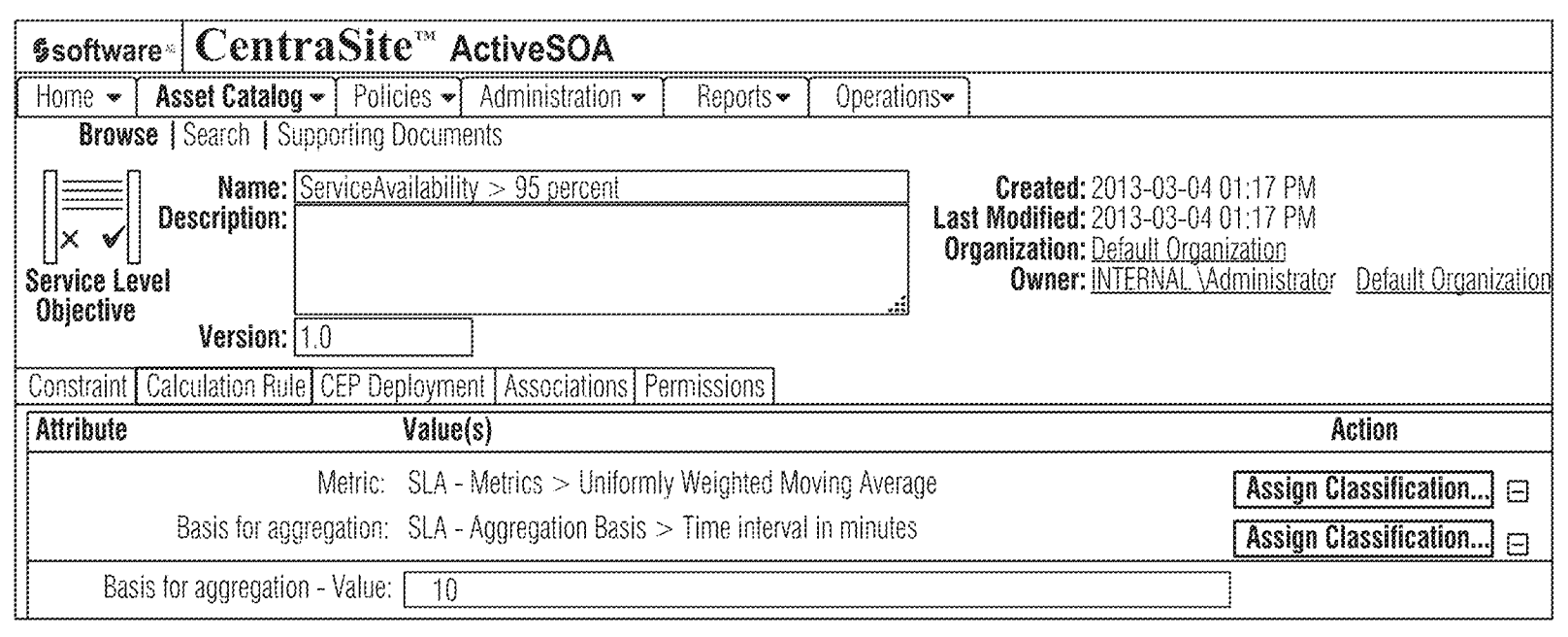

FIG. 10: A schematic illustration of a graphical user interface with detailed information about performance requirements, comprising KPI metric and value in accordance with one embodiment.

Figure 11:
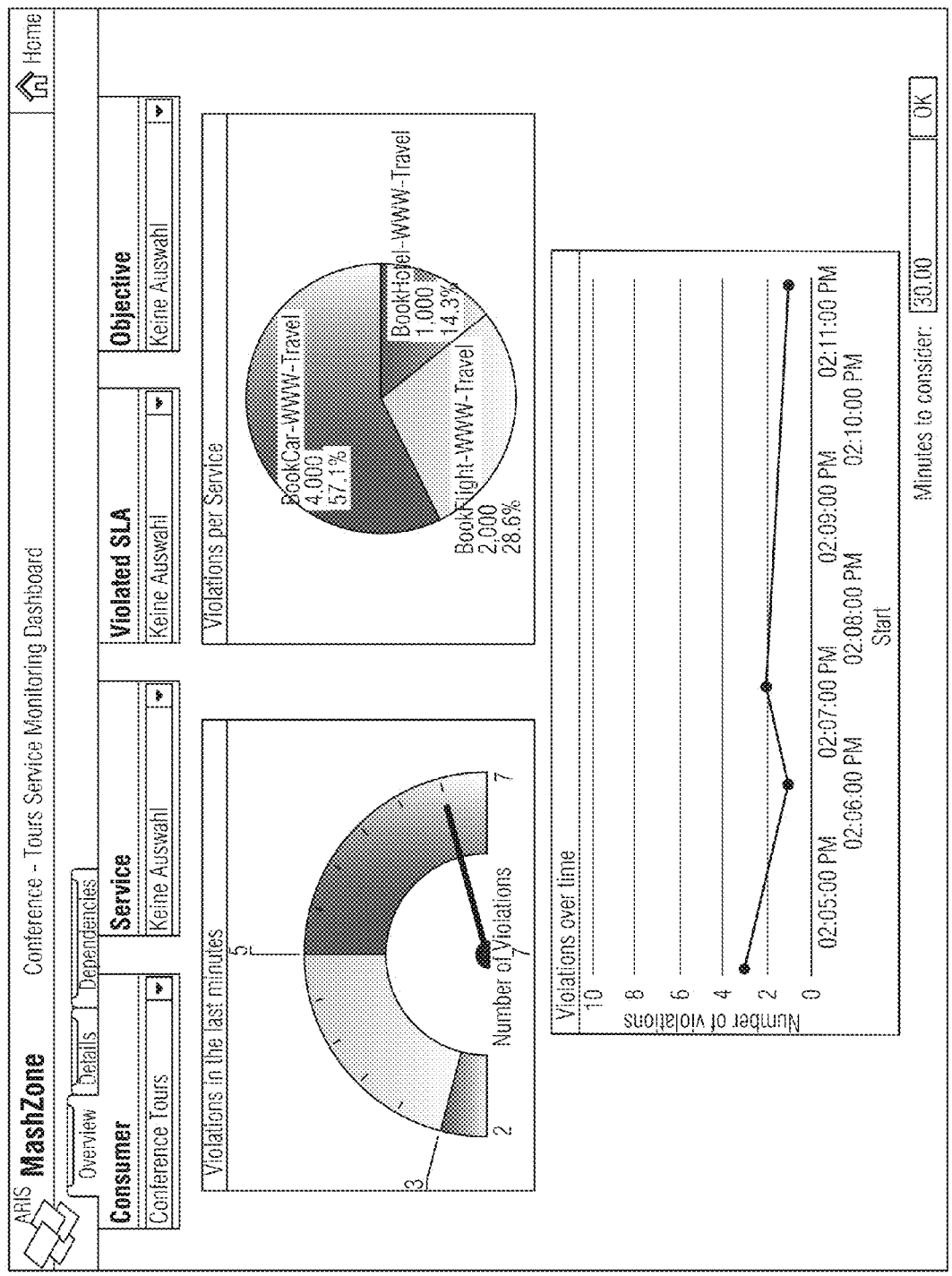

FIG. 11: Three exemplary diagrams about statistics of SLA violations in accordance with one embodiment.

Figure 12:
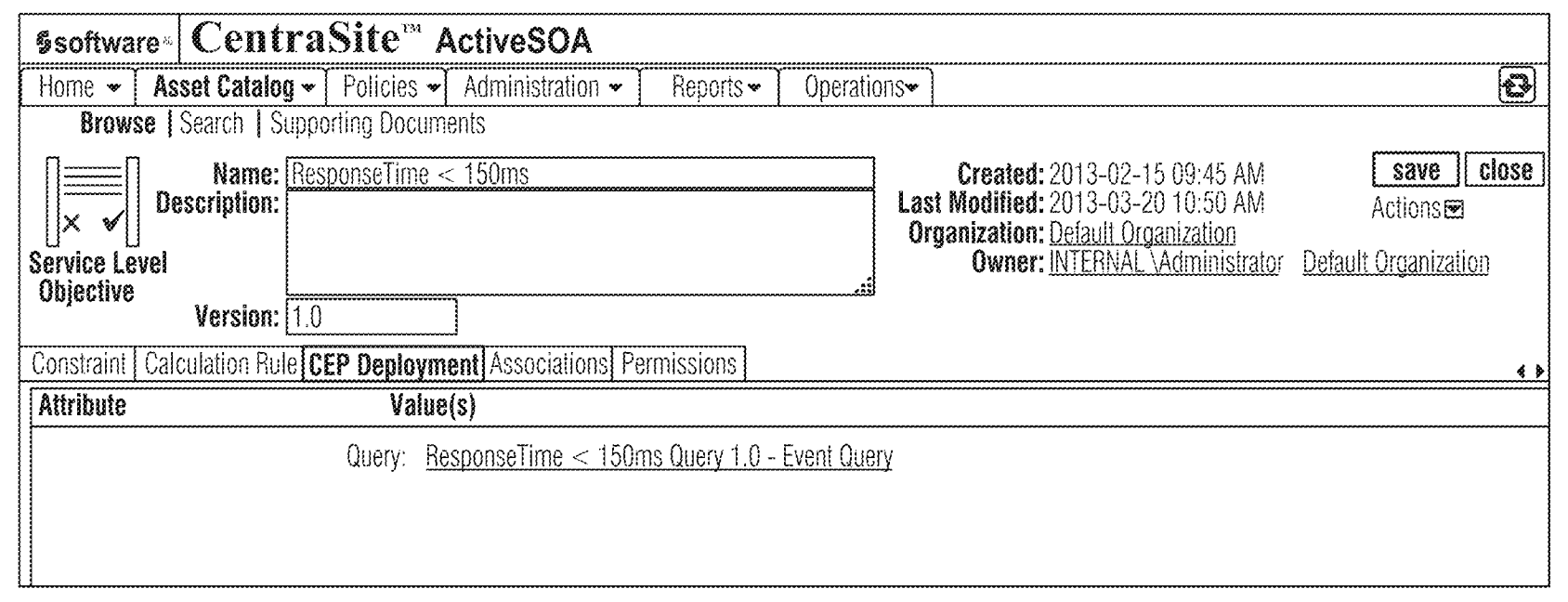

FIG. 12: A schematic illustration of a graphical user interface with query deployment time in accordance with one embodiment.

FIG. 13: A schematic illustration of a graphical user interface with a "Check SLO" query in accordance with one embodiment.

Figure 14:
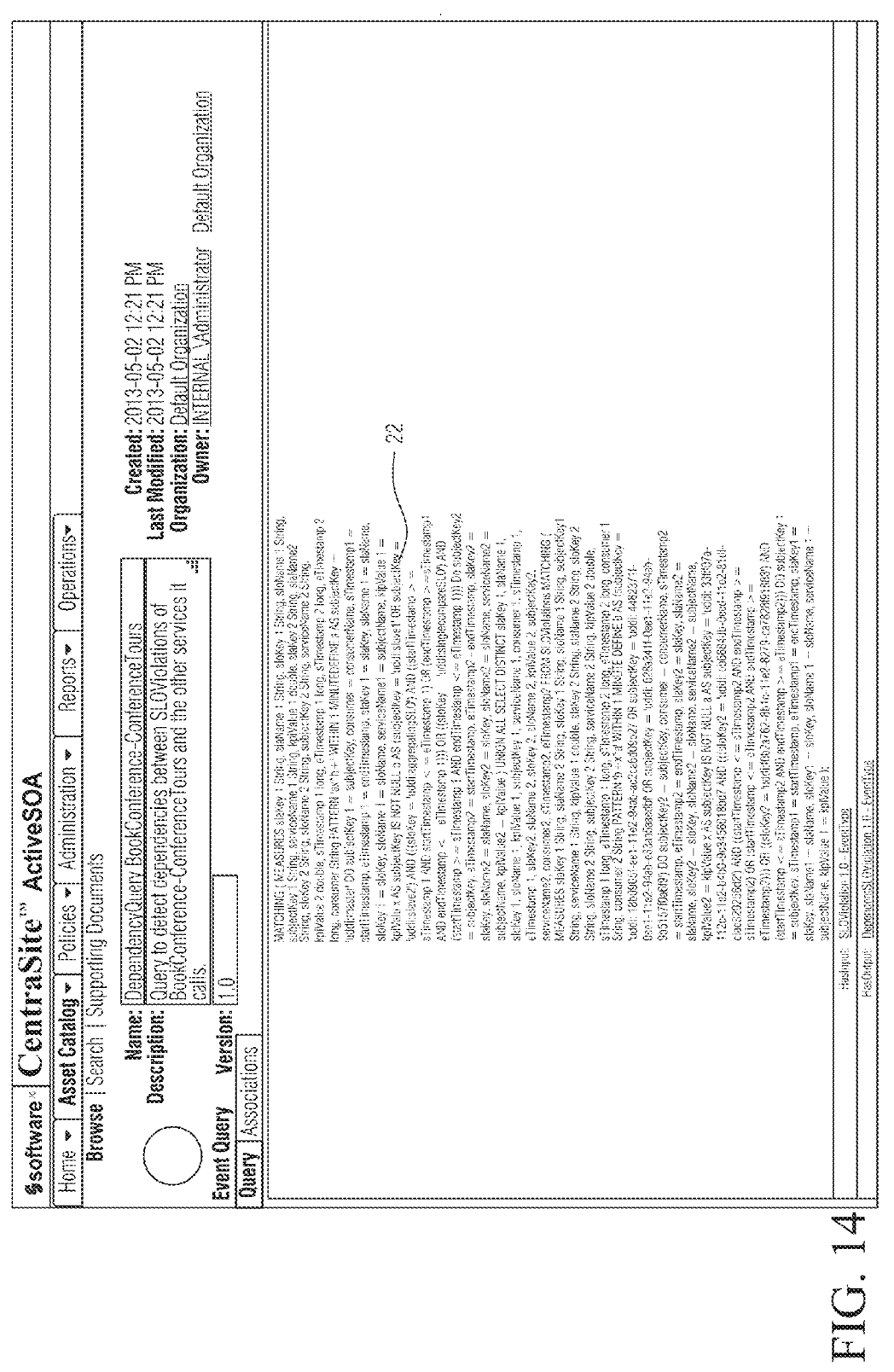

FIG. 14: A schematic illustration of a graphical user interface with a "Check SLO dependencies" query in accordance with one embodiment.

4. DETAILED DESCRIPTION

Overview of the Monitoring System

Certain example embodiments relate to a monitoring system 1 as exemplarily illustrated in FIGS. 1 and 2. As shown in FIGS. 1 and 2, various computing components 40, e.g. services such as VirtualServices in applicant's Mediator or webMethods Optimize for Infrastructure, submit input events 31 (also referred to herein as "base events") which contain detailed information about a completed action, such as a service call, to an event bus (shown in FIGS. 1 and 2).

In one exemplary embodiment, it is possible to use a so-called Mediator sending TransactionEvent data to an SNMP listener (not shown) which then stores that data in a database. In addition or alternatively, this SNMP listener can be adapted for sending the TransactionEvent data to the event bus shown in FIGS. 1 and 2. Also, when using webMethods Optimize for Infrastructure of applicant, information about the performance of ETS (Enterprise Transaction Systems) products can be collected and by means of an extension in the product's DataCollector, this data can be sent as events to the event bus.

The SLA registry 10 (e.g. implemented by the product CentraSite of applicant) comprises information 11 about the computing components 40. One or more service-level agreements (SLAs) 12 are linked to the descriptions 11 of the computing components 40. A single SLA 12 can comprise multiple SLOs 13. These SLOs 13 can be defined in a declarative way based on pre-defined taxonomies (as e.g. listed in FIG. 6) and reflect performance requirements 50.

A compiler 20 of the monitoring system 1 can process the data of the SLA registry 10, namely the details ii about the computing components 40 and SLAs 12 for the generation of one or more event queries 21 and 22. These queries 21 enable the checking of the fulfillment of the SLA(s) 12 based on the input event 31 data on the event bus. Preferably, one query 21 is generated per SLO.

As shown in FIG. 3 (see the arrow between the descriptions 11 of the computing components 40), dependencies between computing components 40 can be considered for generating the SLA queries 22, wherein distinct types of dependencies are plausible. Based on the type of dependency queries can be generated for the determination of an SLO violation that is caused by another one, e.g. the other one might be the root cause for the first one.

Example of a Distributed System to be Monitored

An example of a monitoring system 1 for flight booking is illustrated in FIG. 4, which shows two illustrative computing component descriptions 11 of the type service: "bookFlight" and "checkPayment". A user of "bookFlight" provides payment details, so the "bookFlight" service calls as one exemplary action "checkPayment" before the flights can get confirmed.

In this example, a user of the "bookFlight" service has an SLA named SLA1 with the "bookFlight" provider. For example, SLA1 might specify that the service call shall reply on average over a 10 minutes interval within less than 100 milliseconds. Another exemplary user of "bookFlight" might have an SLA named SLA4 which specifies that over the last 10 calls the average response time shall always be below 100 milliseconds. Yet a further user of "bookFlight" has an SLA5 which specifies that every single call must reply within less than 100 milliseconds.

The "bookFlight" provider has an SLA named SLA2 with the "checkPayment" provider. SLA2 specifies that the service call shall always reply within 20 milliseconds. The computing components "bookFlight" and "checkPayment"

for example take part in a business process where service calls from a single business process can be assigned to a single process instance. The model in the SLA registry reflects this relationship, i.e. the call dependency between "bookFlight" and "checkPayment" (as indicated by the arrow which is labeled with "calls" in FIG. 4) is defined in the information stored in the registry 10.

Further, the computing component "bookFlight" might use a database "FlightTicketDB". Accordingly a database is another example of a computing component 40, whose corresponding description in the registry 10 is shown by the reference numeral ii. For the database, its I/O (input/output) behavior may be monitored as one example. An exemplary SLA3 for the database might accordingly specify that I/O calls shall succeed with more than 99% over each 1 second interval. Calls to the database do in this example not contain information about the business process mentioned above.

It will be appreciated that although the above example serves to book a flight, the individual steps to be performed while carrying out this process are implemented by distinct technical sub-systems, such as the above-mentioned database and two services which execute on respective computer hardware. Accordingly, certain example embodiments focus not on the business-layer, but on the underlying technical implementation of the process and the monitoring of the proper technical operation of its underlying computing components.

Preferred Implementation for Computing Components, their Dependencies and Associated SLAs The following listing illustrates an exemplary XML notation for the information stored in the registry 10, i.e. the computing component 40 descriptions 11, their dependencies and the associated SLAs 12. While XML is preferably used in the context of certain example embodiments, it shall be appreciated that any other format may be employed, which allows for a declarative definition of the respective information.

```
<!-Description of Assets / Computing Components -->
    <Service id=„bookFlight">
        <Relationships>
            <ServiceLevelAgreement id=„SLA1"/>
            <ServiceLevelAgreement id=„SLA4"/>
            <ServiceLevelAgreement id=„SLA5"/>
            <Calls Type=„Service" id=„checkPayment">
                <PayloadIdentification
                    caller=„bF_processId"
                    callee=„cP_processId"/>
            </Calls>
            <Uses Type=„Database"
                id=„FlightTicketDB"/>
        </Relationships>
    </Service>
    <Service id=„checkPayment">
        <Relationships>
            <ServiceLevelAgreement id=„SLA2"/>
        </Relationships>
    </Service>
    <Database id=„FlightTicketDB">
        <Relationships>
            <ServiceLevelAgreement id=„SLA3">
        </Relationships>
    </Database>
<!-Description of SLAs -->
    <ServiceLevelAgreement id=„SLA1">
        <consumer id=„A bookFlight Service Consumer"/>
        <ServiceLevelObjective id="SLA1.SLO1">
            <ExecutionTime
                KPI=„Response Time in
                ms"value=„100"
                operator=„less than"
                metric=„Uniformly Weighted"
                AggregationBasis=„Time interval in
                ms"
                    AggregationInterval=„600000"/>
        </ServiceLevelObjective>
    </ServiceLevelAgreement>
    <ServiceLevelAgreement id=„SLA2">
        <consumer id=„The bookFlight Service Provider"/>
        <ServiceLevelObjective id="SLA2.SLO1">
            <ExecutionTime
                KPI=„Response Time in ms"
                value=„20"
                operator=„less than or equal"
                metric=„Single Comparison"/>
        </ServiceLevelObjective>
    </ServiceLevelAgreement>
    <ServiceLevelAgreement id=„SLA3">
        <consumer id=„The bookFlight Service Provider"/>
        <ServiceLevelObjective id="SLA3.SLO1">
            <ExecutionTime
                KPI=„Reliability in
                %"value=„99"operator=„greater
                than"metric=„Uniformly
                Weighted"AggregationBasis=„Time interval
                in ms"AggregationInterval=„1000"/>
        </ServiceLevelObjective>
    </ServiceLevelAgreement>
    <ServiceLevelAgreement id=„SLA4">
        <consumer id=„Another bookFlight Service Consumer"/>
        <ServiceLevelObjective id="SLA4.SLO1">
            <ExecutionTime
                KPI=„Response Time in
                ms"Value=„100"operator=„less
                than"metric=„ Uniformly Weighted
                "AggregationBasis=„Number of Events"
                    AggregationInterval=„10" />
        </ServiceLevelObjective>
    </ServiceLevelAgreement>
    <ServiceLevelAgreement id=„SLA5">
        <consumer id=„Yet another bookFlight Service Consumer"/>
        <ServiceLevelObjective id="SLA5.SLO1">
            <ExecutionTime
                KPI=„Response Time in
                ms"Value=„100"operator=„less
                than"metric=„Single Comparison"/>
            /ServiceLevelObjective>
    </ServiceLevelAgreement>
```

As can be seen, the above exemplary listing reflects the registry information 11 relating to the three exemplary computing components 40 "bookFlight" service, "checkPayment" service and "FlightTicketDB" database. Each computing component is associated with one or more SLAs 12 (e.g. the "bookFlight" service is associated with the SLAs SLA1, SLA4 and SLA5 mentioned further above). The SLAs defined in the above listing correspond to the examples mentioned further above. For example, the SLA with the identifier "SLA1" in the listing defines that the service call shall reply on average over a 10 minutes interval within less than 100 milliseconds.

Definition of Relationships/Dependencies Between Computing Components

As already explained, an aspect of certain embodiments is to correlate individual SLA violations based on relationships and/or dependencies between the involved computing components 40. Such relationships can be split into the following groups:

a) hard relationship:
    If an asset (i.e. a computing component 11) "A" calls an asset "B" and based on the event payload, the details comprised therein allow to directly connect the two input events 31, then the query can directly evaluate this dependency, which is herein called a "hard relationship".

In the example above, the relationship between the services "bookFlight" and "checkPayment" is such a hard relationship, which is materialized via the element "bF_processId" and element "cP_processId" as described in the service description for "bookFlight" shown above.

If "bookFlight" calls take longer than allowed, which causes an SLO-violation event, and also the related "checkPayment" calls take too long, which also creates an SLO-violation event 32 (cf. also FIG. 5), these SLO-violation events can be correlated because the SLO-violation events 32 comprise their input events 31.

In this context, it is important to differentiate between the (meta)information in the registry 10 (e.g. the description ii of a computing component 40, such as the service "checkPayment") and the instance information comprised in the events, e.g. indicating that a call to the computing component occurred.

The (meta)information in the registry 10 reflects that (a) the dependency exists in the first place, and (b) how the instance information can be correlated correctly.

In the example presented herein, the description of the relationship "bookFlight→checkPayment" is comprised in the entry "Service/Relationships/Calls" in the above listing. This entry comprises the entry "PayloadIdentification", which reflects the values by means of which two calls can be correlated. If an event has the same value in the fields "bF_processId" and "cP_processId", then the two calls relate. The fact that there are such identifiers, i.e. that there is a "PayloadIdentification" element in the description ii, indicates that is it a "hard relationship".

As long as the SLOs aggregate multiple events into one KPI value (see e.g. the exemplary SLAs SLA1 and SLA4), the calls which cause the violations cannot be uniquely identified (which is herein referred to as weak indication). In the case of a weak indication, the generated event query can detect and return the related SLO violations, but it cannot boil this down to a single call.

If, on the other hand, the SLO/SLA is related to exactly one call (see e.g. the exemplary SLAs SLA5 and SLA2), e.g. each call to "bookFlight" shall return in 100 milliseconds and each call to "checkPayment" shall return in 20 milliseconds, calls can be unambiguously correlated. In this case, based on the "bF_processId" and "cP_processId" identifiers in the input events 31 an event-query which produces a complex SLO-violation event 32 which shows "checkPayment" being the root-cause for the "bookFlight" SLO violation can be generated (which is herein referred to as strong indication).

b) loose relationship:

If an asset (i.e. a computing component 11) "A" is only loosely related to an asset ii "B", e.g. service "A" uses database "B" but many other services do the same, then the dependency based on overlapping execution times can be evaluated, which is referred to as loose relationship. Like with weak indications the generated event query can detect potential root causes based on timely overlap of operations with failed SLOs, but it cannot boil this down to single calls.

In contrast to a "hard relationship", the use relationship (cf. "Service/Relationships/Uses" in the above listing) does not provide a correlation possibility, and is therefore called "loose relationship". Here, the relationship reflects that the service uses the database, but individual calls cannot be correlated, since the database call typically does not comprise the process ID (note that the Process ID is only one example. Generally, what is required for the "hard relationship" is that an unambiguous assignment of individual calls is possible, i.e. that the calls are executed within a common context).

Let service "bookFlight" take longer than allowed which causes an SLO-violation event. Service "bookFlight" uses database "FlightTicketDB" which indicates some I/O problems at the same time when "bookFlight" is executed. Although without information for a particular call to the database, the generated query 21 produces a complex SLO-violation event 32, in turn query 22 produces an SLODependencyViolationEvent 33 which not only shows the issue with the "bookFlight" but also comprises the information about simultaneous problems with the "FlightTicketDB".

Definition of Event Types

In certain example embodiments, the event queries 21 fire new events 32 with detailed information about SLO/SLA violations. Consumers such as dashboards and/or java programs can subscribe to such events 32 (also referred to as "SLO violation events") and react on these events 32 when needed. FIG. 5 illustrates a possible format for the used event types. From top to bottom, the types get more complex:

For example, the events 31 which are fired when a computing component 11 performs a certain action and which serve as input for the CEP engine 30 adhere to the type "BaseEvent". As shown in FIG. 5, such events comprise an identifier of the computing component 40 which was called (element <Id> in FIG. 5), an indication of the calling computing component 11 (element <Consumer>), a time-stamp indicating the time of the call (element <StartTimestamp>) and the time span it took to execute the call, i.e. the measured response time (element <TotalRoundTripTime>). Such events further comprise a call payload, which comprises the identifiers for hard relationships.

Example: Base event 31 when service bookFlight misses SLA5, i.e. it takes longer than 100 ms:

```
<BaseEvent>
  <Id>bookFlight</Id>
  <Consumer>A bookFlight Service Consumer</Consumer>
  <Payload>
    <FlightNo>DE1234</FlightNo>
    <FlightDate>2013-12-12</FlightDate>
    <Passenger>
      <FirstName>Ernst</FirstName>
      <LastName>Maier</LastName>
    </Passenger>
    <CreditCardNo>1234-2345-0030-1234</CreditCardNo>
    <Amount>500</Amount>
    <bF_processId>bf_20130427_MaierErnst_DE1234_784632789</bF_processId>
  </Payload>
  <StartTimestamp>2013-04-27T12:12:50.100</StartTimestamp>
  <TotalRoundTripTime>210</TotalRoundTripTime>
</BaseEvent>
```

Example: Base event 31 when service checkPayment misses SLA2, i.e. it takes longer than 20 ms:

```
<BaseEvent>
    <Id>checkPayment</Id>
    <Consumer>The bookFlight Service Provider</Consumer>
    <Payload>
        <Passenger>
            <FirstName>Ernst</FirstName>
            <LastName>Maier</LastName>
        </Passenger>
        <CreditCardNo>1234-2345-0030-1234</CreditCardNo>
        <Amount>500</Amount>
        <cP_processId>bf_20130427_MaierErnst_DE1234_784632789</cP_processId>
    </Payload>
    <StartTimestamp>2013-04-27T12:12:50.101</StartTimestamp>
    <TotalRoundTripTime>190</TotalRoundTripTime>
</BaseEvent>
```

Events of the type "SLOViolationEvent" 32 comprise the "BaseEvent" if there is no aggregation and the SLO/SLA relates to a single "BaseEvent". In the example above, for SLA5 an "SLOViolationEvent" for "bookFlight" comprises "BaseEvent/Payload/bF_processId" and an "SLOViolationEvent" for "checkPayment" comprises "BaseEvent/Payload/cP_processId". Furthermore, the SLOViolationEvent refers to the respective SLO (element <ServiceLevelObjective>), the expected performance requirement value (element <ExpectedValue>) and the actually measured value (element <MeasuredValue>). The latter may be generated by the respective computing components themselves or by monitoring components of the computing components.

Example: Event 32 that is generated when violation for SLA5. SLO1 is discovered by the generated query:

```
<SLOViolationEvent>
    <Id>bookFlight</Id>
    <Consumer>A bookFlight Service Consumer</Consumer>
    <ServiceLevelObjective>SLA5.SLO1</ServiceLevelObjective>
    <ExpectedValue>100</ExpectedValue>
    <MeasuredValue>210</MeasuredValue>
    <BaseEvent>
        <Id>bookFlight</Id>
        <Consumer>A bookFlight Service Consumer</Consumer>
        <Payload>
            <FlightNo>DE1234</FlightNo>
            <FlightDate>2013-12-12</FlightDate>
            <Passenger>
                <FirstName>Ernst</FirstName>
                <LastName>Maier</LastName>
            </Passenger>
            <CreditCardNo>1234-2345-0030-1234</CreditCardNo>
            <Amount>500</Amount>
<bF_processId>bf_20130427_MaierErnst_DE1234_784632789</bF_processId>
        </Payload>
        <StartTimestamp>2013-04-27T12:12:50.100</StartTimestamp>
        <TotalRoundTripTime>210</TotalRoundTripTime>
    </BaseEvent>
</SLOViolationEvent>
```

Example: Event 32 that is generated when violation for SLA2. SLO1 is discovered by the generated query:

```
<SLOViolationEvent>
    <Id> checkPayment </Id>
    <Consumer>A bookFlight Service Consumer</Consumer>
    <ServiceLevelObjective>SLA5.SLO1</ServiceLevelObjective>
    <ExpectedValue>20</ExpectedValue>
    <MeasuredValue>190</MeasuredValue>
    <BaseEvent>
        <Id>checkPayment</Id>
        <Consumer>The bookFlight Service Provider</Consumer>
```

-continued

```
        <Payload>
            <Passenger>
                <FirstName>Ernst</FirstName>
                <LastName>Maier</LastName>
            </Passenger>
            <CreditCardNo>1234-2345-0030-1234</CreditCardNo>
            <Amount>500</Amount>
            <cP_processId>bf_20130427_MaierErnst_DE1234_784632789</cP_processId>
        </Payload>
        <StartTimestamp>2013-04-27T12:12:50.101</StartTimestamp>
        <TotalRoundTripTime>190</TotalRoundTripTime>
    </BaseEvent>
</SLOViolationEvent>
```

Events of the type "SLOViolationDependencyEvent" 33 comprise the "SLOViolationEvents" 32 and a description of the relationship that is the basis for the dependency analysis.

Example:

```
<SLOViolationDependencyEvent>
    <SLOViolationEvent> ...... </SLOViolationEvent >
    <Relationship>
bf_20130427_MaierErnst_DE1234_784632789</Relationship>
    <SLOViolationEvent> ...... </ SLOViolationEvent >
    ...
</ SLOViolationDependencyEvent >
```

Optional Feature: SLA Lifecycles

In certain embodiments, SLA descriptions in the registry 10 can have a lifecycle, e.g. with states such as "draft", "productive", "retired", or the like. The query 21 and 22 generation and deployment can then be triggered based on lifecycle state changes. For example, whenever an SLA 12 is activated, i.e. its lifecycle state changes from "draft" into "productive", a policy may be executed which takes the SLA 12 and/or SLO details, the computing component 11 type information, and its corresponding event data structure to automatically generate event queries 21 and 22 and deploy these queries 21 and 22 to the configured complex event processing engine 30. Additionally, whenever an SLA 12 is de-activated the corresponding event query/queries 21 and 22 can be automatically un-deployed. This aspect is particularly advantageous, since it ensures that the queries currently deployed at the CEP engine 30 are always consistent with the current state of the SLAs.

Optional Feature: Event Handlers and Actions

Event handler programs which subscribe for the "SLOViolationEvents" 32 and "SLOViolationDependencyEvents" 33 (called "Component Making use of the Events" in the Figures) may react on these events. In certain embodiments, it is possible to extend the SLA registry 10 entries with descriptions of required actions. Based on the violation event 32 and 33 content (field "ServiceLevelObjective") the event handler can search for the corresponding SLA 12 descriptions in the registry 10, and perform the actions as described.

Preferred Implementation Comprising the Graphical User Interface

As mentioned above, the registry 10 may in certain embodiments be implemented by "CentraSite" of applicant. In the following, the graphical user interface (the "CentraSite" UI side) is illustrated. It shall be appreciated that the present invention, however, is not limited to the use of CentraSite, but that any suitable registry and corresponding graphical user interface may be used.

FIG. 6 shows a screenshot of an exemplary taxonomy for the SLAs 12 and SLOs. An example for a SLA 12, comprising two SLOs for one service for one Consumer is shown in FIG. 7. Further, a description of actions for SLA 12 violations (see the optional feature "event handlers and actions" above) is shown in FIG. 8. The detailed description of one of the two SLOs of FIG. 7, comprising the KPI description, the comparator and KPI value is shown in FIG. 9. The detailed description about the calculation of the KPI values is shown in FIG. 10. In summary, by means of a graphical user interface, certain example embodiments provide an easy way of defining all information necessary to generate the event queries.

More particularly, based on the above-summarized descriptions the event query generation can be triggered e.g. when the CentraSite user changes the lifecycle state of the SLA from any non-productive state into the productive state (see the optional feature "SLA lifecycles" above).

In yet another aspect, detected SLO violation events can be consumed by other products, such as without limitation applicant's ARIS MashZone, as exemplarily shown in FIG. 11.

As shown in FIG. 12, in one embodiment at the query deployment time, i.e. when query gets deployed to a CEP engine 30, an event query asset can be registered in the registry 10 and linked to the corresponding SLO object with that query object (as shown in FIGS. 12 and 13). This allows the determination of which queries have been deployed to which CEP engine 30 in the registry 10. In case of multiple CEP engines 30, a load balancing becomes possible to increase system performance.

FIG. 13 further comprises an exemplary query 21 for an SLO which aggregates response times over last 5 calls. Further exemplary queries 21 are shown below.

FIG. 14 further comprises an exemplary query 22 for an SLO dependency analysis for a weak relationship which only correlates SLO violation events based on timely overlap.

Preferred Implementation of the Generation of SLA Violation Queries 21

In the following, the generation of the event queries 21 in accordance with certain example embodiments is illustrated by means of simple pseudo-code examples:
Compilation of Simple SLOs:

```
CompileSLA (SLAdescription){
    consumers := identify the consumers for whom the SLA
applies
    For all SLOs in SLAdescription:
        compileSLO(SLOdescription, consumers)
}
CompileSLO(SLOdescription, consumers){
    FROMClause := generateFromClause (SLOdescription)
    WHEREClause := generateWhereClause(SLOdescription,
consumers)
    SELECTClause := generateSELECTString(SLOdescription)
    addToRegistry(SELECTClause + FROMClause +
WHEREClause)
}
generateFromClause(SLOdescription){
    assettype := identify asset type under monitoring of
SLO
        eventtype := identify the corresponding eventtype
        identify the structure of the asset type's base
event structure
            evententry := identify the entry in the base event
structure for this SLO
            metric := identify the SLO's metric
            //The metric information contains the information
            about the time window operator to be
            //applied when doing any aggregations
            generateFROMString(eventtype, evententry, metric)
}
generateWhereClause(SLOdescription, consumers){
    assetid := identify the asset where the SLA applies
        from SLO description
    assetIdentifierAttribute := identify the entry in
    event type which contains the assetid
    consumersIdentifierAttribute :=
    identify the entry in the event type which contains
    the consumer data
    KPIValueComparisonString := generate string for
    comparison with specified KPI value
        generateWHEREString(assetid,
    assetIdentifierAttribute, consumers,
    consumerIdentifierAttribute, KPIValueComparisonString)
}
```

Simplified examples of generated queries 21 are shown below. For simplification, the queries 21 are annotated with narrative text preceded by a ' . . . +' string.

Examples of Generated Queries 21 for Simple SLOs

The simplest query 21 is for evaluating SLOs on single BaseEvents (e.g. SLA2 explained further above):

```
SELECT -- fields of SLOViolationEvent
    Id,
    Consumer,
    'SLA2.SLO1' as ServiceLevelObjective,
    '20' as ExpectedValue,
    TotalRoundTripTime as MeasuredValue,
    ... + BaseEvent details from payload
FROM
    BaseEvent
WHERE TotalRoundTripTime > 20
    AND Id = 'checkPayment'
    AND Consumer = 'The bookFlight Service Provider';
```

The SLO specifies that the response time must be less than or equal to 20 milliseconds, thus an SLO violation event 32 is generated when it is more than 20 milliseconds.

The following exemplary query uses a time-based aggregation for SLA1 (average response time over last 10 minutes is below 100 milliseconds):

```
SELECT -- fields of SLOViolationEvent
    sub.serviceKey AS Id,
    sub.consumerName AS Consumer,
    'SLA1.SLO1' AS ServiceLevelObjective,
    '100' AS ExpectedValue,
    sub.kpiValue AS MeasuredValue,
    ...
FROM
    (SELECT
        -- needed information about violation
        rawData.Id AS serviceKey,
        rawData.Consumer AS consumerName,
        MIN(infoQ.startTimestamp) AS startTimestamp,
        MAX(infoQ.endTimestamp) AS endTimestamp,
        -- calculate kpi value
        (SUM(UDF__uniformWeighting("Details$TotalRoundTripTime",
        "BasicRuntimeEvent$TimeStamp",
        infoQ.startTimestamp,
        infoQ.endTimestamp,
        infoQ.cnt))
        / MIN(UDF__uniformWeightingDenominator(infoQ.cnt)))
        AS kpiValue
```

```
            FROM
                -- retrieve the events to consider for
        calculation
                UDO__SLAEvents(BaseEvent;
                    'Id',
                    'Consumer',
                    'StartTimestamp',
                    'TIME',
                    600000) AS rawData
                -- get the number of events, as well as the
        first and last   timestamp
                (SELECT
                    Id,
                    Consumer,
                    COUNT(*) AS cnt,
                    MIN(StartTimeStamp) as startTimestamp
                    MAX(StartTimeStamp) AS endTimestamp
                    FROM UDO__SLAEvents(BaseEvent;
                        Id,
                        Consumer,
                        StartTimestamp,
                        'TIME',
                        600000)
                    GROUP BY Id,
                        Consumer
                ) AS infoQ
                -- match subject and consumer with subquery
                WHERE rawData.Id = infoQ.Id
                    AND rawData.Consumer = infoQ.Consumer
            ) AS sub
        -- check if it is a violation
        WHERE sub.kpiValue >=100
            AND sub.serviceKey ='bookFlight'
            AND sub.consumerName ='A bookFlight Service
        Consumer';
```

The underlined parts in the above example illustrate how the SLA's metric, aggregation basis and KPI are reflected in the query 21.

The following exemplary query uses a count based aggregation for SLA4 in the above example (average response time over last 10 service call is below 100 milliseconds):

```
        SELECT -- fields of SLOViolationEvent
                sub.serviceKey AS Id,
                sub.consumerName AS Consumer,
                'SLA4.SLO1' AS ServiceLevelObjective,
                '100' AS ExpectedValue,
                sub.kpiValue AS MeasuredValue,
                ...
        FROM
            (SELECT
                -- needed information about violation
                rawData.Id AS serviceKey,
                rawData.Consumer AS consumerName,
                MIN(infoQ.startTimestamp) AS startTimestamp,
                MAX(infoQ.endTimestamp) AS endTimestamp,
                -- calculate kpi value
                (SUM(UDF__uniformWeighting("Details$TotalRoundTripTim
        e",
                    "BasicRuntimeEvent$TimeStamp",
                    infoQ.startTimestamp,
                    infoQ.endTimestamp,
                    infoQ.cnt))
                    /
                MIN(UDF__uniformWeightingDenominator(infoQ.cnt))) AS
        kpiValue
                FROM
                -- retrieve the events to consider for
        calculation
                UDO__SLAEvents(BaseEvent;
                    'Id',
                    'Consumer',
                    'StartTimeStamp',
                    'COUNT',
                    10) AS rawData
                -- get the number of events, as well as the
                first and last timestamp
                (SELECT
                    Id,
                    Consumer,
                    COUNT(*) AS cnt,
                    MIN(StartTimeStamp) as startTimestamp
                    MAX(StartTimeStamp) AS endTimestamp
                    FROM UDO__SLAEvents(BaseEvent;
                        Id,
                        Consumer,
                        StartTimeStamp,
                        'COUNT',
                        10)
                    GROUP BY Id,
                        Consumer
                ) AS infoQ
                -- match subject and consumer with subquery
                WHERE rawData.Id = infoQ.Id
                    AND rawData.Consumer = infoQ.Consumer
            ) AS sub
        -- check if it is a violation
        WHERE sub.kpiValue >=100
            AND sub.serviceKey ='bookFlight'
            AND sub.consumerName ='Another bookFlight Service
        Consumer';
```

Note, the queries can comprise user-defined extensions to the query language, such as:

a) User-defined functions (e.g. UDF_uniformWeighting and UDF_uniformWeightingDenominator in the above example) can be used to calculate weighted averages, in this case uniformly weighted execution times as described in the "metrics" entries in the example SLAs 12. Additional functions can calculate metrics like linearly or exponentially weighted execution times over the time window under investigation.

b) User-defined operator (such as UDO_SLAEvents) disambiguates the set of events to be taken into account in case multiple events arrive at the same time.

For example: three events arrive at time t1 and later three events arrive at time t2, the window count is 5, we need a mechanism to unambiguously select two events from t1 (in order to end up with an accumulated count of 5), otherwise the result would not be reproducible.

As an intended technical side-effect the operator makes sure that we first collect all events that are created at the same time and then pass on the result. Alternatively, every event would be evaluated separately which results in too many SLO violation events.

Compilation of SLOs with Dependencies

```
generateDependencyQueries (SLAdescription){
    service = get SLAs service (SLAdescription)
    providers = get all providers for service (service)
    For all providers:
        generateProviderDependencyQuery(provider,
                                        SLAdescription
                                        )
}
generateProviderDependencyQuery(provider, consumerSLA)
{
    providerSLAs = get the provider's SLAs (provider)
    For all providerSLAs:
        generateDependencyQuery(providerSLA,
                                consumerSLA)
}
generateDependencyQuery(providerSLA, consumerSLA) {
    consumerSLOs = get information about all potential
                SLO violations for consumer
                (consumerSLA)
```

```
    providerSLOs = get information about all potential
            SLO violations for providers
            (providerSLA)
    for all consumerSLO-providerSLO pairs:
        generateSLODependencyQuery(consumerSLO, providerSLO)
}
generateSLODependencyQuery(consumerSLO, providerSLO){
    if (consumerSLO aggregates values) or
        (providerSLO aggregates values) or
        (Consumer-provider-relationship is a loose
        relationship)
    then
    {
        generateTimeBasedDependencyQuery
                    ( consumerSLO, providerSLO )
    } else {
        generateInstanceBasedDependencyQuery
                    ( consumerSLO, providerSLO )
    }
generateInstanceBasedDependencyQuery (consumerSLO,
providerSLO){
{
    SELECTClause = generate query to return details of
            violation events including the instance
            relation details and base events
    FROMClause = " FROM SLOViolationEvent "
    MATCHINGClause = generate the matching clause which
            correlates SLOViolationEvents based
            on the ServiceLevelObjective values
            and PayloadIdentification description
            and timely overlap of the
            SLOViolationEvents
            including the BaseEvent details
    addToRegistry(SELECTClause
                + FROMClause
                + MATCHINGClause)
}
generateTimeBasedDependencyQuery (consumerSLO,
providerSLO){
{
    SELECTClause = generate query to return details of
            violation events
    FROMClause = " FROM SLOViolationEvent "
    MATCHINGClause = generate the matching clause which
            correlates SLOViolationEvents based
            on the ServiceLevelObjective values
            and
            timely overlap of the
            SLOViolationEvents
    addToRegistry(SELECTClause
                + FROMClause
                + MATCHINGClause)
}
```

Examples of Generated Queries with Dependencies

The following exemplary query creates SLOViolationDependencyEvent 33 information based on a weak indication of root causes (in this case SLA1 and SLA3 for the "uses"-relationship of "bookFlight" and "FlightTicketDB"):

```
-- sequence: superordinate SLOViolation (consumer)
...dependent SLOViolation(provider)
SELECT ...+ details of first SLOViolationEvent
        'uses relationship' AS Relationship
        ...+ details of second SLOViolationEvent
-- input stream only containing master and slave services
FROM SLOViolationEvent
    MATCHING (
        PARTITION BY Consumer
        MEASURES ...+ details of first SLOViolationEvent
            without BaseEvent detail data
                ...+ details of second
                SLOViolationEvent without BaseEvent
                detail data
        PATTERN 'ax*b+'
        DEFINE
            -- the relationship source, calling the
        others
            a AS ServiceLevelObiective ='SLA1.SLO1'
            DO -- save service, consumer and
        timestamps
                ...+ extract details of first
        SLOViolationEvent without BaseEvent detail data
                sTimestamp1 = StartTimeStamp,
                eTimestamp1 = StartTimeStamp +
        TotalRoundTripTime,
            -- arbitrary service
            x AS ServiceLevelObjective IS NOT NULL
            -- relationship target within sources
        execution bounds
            b AS ServiceLevelObiective = 'SLA3.SLO1'
            AND - overlap intime
                ( (StartTimeStamp >=sTimestamp1 AND
        StartTimeStamp <eTimestamp1)
                OR (StartTimeStamp +TotalRoundTripTime >
        sTimestamp1
                AND StartTimeStamp +TotalRoundTripTime <=
        eTimestamp1))
            DO
                -- save service, consumer and timestamps
                ...+ extract details of second
        SLOViolationEvent without BaseEvent detail data
    )
    UNION ALL
        -- same again but the other sequence, dependent
        SLOViolation event before superordinate event
        ...
    ;
```

The following exemplary query creates SLOViolationDependencyEvent 33 information based on a strong indication of root causes (correlation based on a "calls"-relationship of components with identifiers and occurrence of violation at same time for SLA5 and SLA2, extensions compared to the previous query are underlined):

```
-- sequence: superordinate SLOViolation (consumer)
...dependent SLOViolation(provider)
SELECT ...+ details of first SLOViolationEvent
        ('call relationship on ' + processID) AS
    Relationship
        ...+ details of second SLOViolationEvent
-- input stream only containing master and slave services
FROM SLOViolationEvent
    MATCHING (
        PARTITION BY Consumer
        MEASURES processID,
            ...+ details of first SLOViolationEvent
            including BaseEvent detail data
            ...+ details of second SLOViolationEvent
            including BaseEvent detail data
        PATTERN 'ax*b+'
        DEFINE
            -- the relationship source, calling the others
            a AS ServiceLevelObiective ='SLA5.SLO1'
            DO
                -- save service, consumer and
        timestamps
                ...+ extract details of first
        SLOViolationEvent including BaseEvent detail data
                sTimestamp1 = StartTimeStamp,
                eTimestamp1 = StartTimeStamp +
        TotalRoundTripTime,
                -- save the processId as stored
                inside the SLOViolationEvent of SLA5.SLO1
                processID =
                BaseEvent/Payload/bF processId
            -- arbitrary service
            x AS ServiceLevelObjective IS NOT NULL
```

-continued

```
        -- relationship target within sources
  execution bounds
        b AS ServiceLevelObjective = 'SLA2.SLO1'
            AND -- full overlap intime
            ( (StartTimeStamp >=sTimestamp1)
            AND (StartTimeStamp +TotalRoundTripTime
            <=eTimestamp1)
            )
            AND -- correlation basedon
            PayloadIdentification data (see service
            description)
            processID =
            BaseEvent/Payload/cP processId
            DO
                    -- save service, consumer and timestamps
                    ...+ extract details of second
        SLOViolationEvent including BaseEvent detail data
        )
        UNION ALL
            -- same again but the other sequence, dependent
            SLOViolation event before superordinate event
            ...
    ;
```

GLOSSARY

CEP: Complex Event Processing

EQL: Event Query Language. There is no standard for EQL. For example, Oracle calls it Continuous Query Language (CQL, http://docs.oracle.com/cd/E16764_01/doc.1111/e12048/intro.htm). Syntax of the language is SQL-based.

KPI: Key Performance Indicator: describes a measure that can be used to assess the SLO quality.

Metric: Describes how to calculate the KPI, i.e. from which base data and which kind of aggregation to apply.

SLA: Service Level Agreement: mutual agreement between a service provider and a consumer about the service quality and/or costs.

SLO: Service Level Objective: An SLA can cover various aspects of the service quality/cost, each individual aspect is covered in a separate SLO; sometimes also called Service Level Expression (see also http://en.wikipedia.org/wiki/Service_level_objective).

SLOs are specific measurable characteristics of the SLA such as availability, throughput, frequency, response time, or quality. The SLO may be composed of one or more quality-of-service measurements that are combined to produce the SLO achievement value. SLOs should generally be specified in terms of an achievement value or service level, a target measurement, a measurement period, and where and how measured.

Strong Relationship: relationship between two SLAs that allows for unambiguously identifying related BaseEvents of the related computing components.

Loose Relationship: relationship between SLAs that does not allow for such an unambiguous identification (loose relationship implies that an SLODependencyViolation can only give a weak indication).

Hard Indication: SLOViolationDependencyEvent with two related SLOViolationEvents that each contains BaseEvent information based on a strong relationship.

Weak Indication: SLOViolationDependencyEvent that do not have a hard indication, either because the relationship is only a loose one or because aggregations prevent from having BaseEvents at hand.

It will be appreciated that as used herein, the terms system, subsystem, service, engine, module, programmed logic circuitry, and the like may be implemented as any suitable combination of software, hardware, firmware, and/or the like. In other words, these terms may include processing resources such as, for example, at least one processor and a memory, suitable for carrying out instructions for performing specific functions. It also will be appreciated that the storage locations herein may be any suitable combination of disk drive devices, memory locations, solid state drives, CD-ROMs, DVDs, tape backups, storage area network (SAN) systems, and/or any other appropriate tangible non-transitory computer readable storage medium. Cloud and/or distributed storage (e.g., using file sharing means), for instance, also may be used in certain example embodiments. It also will be appreciated that the techniques described herein may be accomplished by having at least one processor execute instructions that may be tangibly stored on a non-transitory computer readable storage medium. The registries, objects, etc., discussed herein may be stored in connection with transitory or non-transitory computer readable storage media.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A monitoring system for monitoring operation of a plurality of distributed computing components, the monitoring system comprising:
   at least one processor and a memory;
   a registry stored in the memory and configured to store (a) descriptions of the plurality of computing components and (b) a plurality of service-level agreements (SLAs) where each one of the plurality of SLAs specifies at least one performance requirement for at least one of the plurality of distributed computing components;
   a compiler configured to generate at least a first and a second continuous query based on the information stored in the registry; and
   a complex event processing (CEP) engine, operating on the at least one processor, configured to:
      execute the first continuous query on input events indicating actions performed by the plurality of distributed computing components and corresponding performance information;
      determine, as part of execution of the first continuous query, that a violation of a first SLA of the plurality of SLAs has occurred and, in accordance with determination of violation of the first SLA, output a first event indicating the violation of the first SLA;
      determine, as part of execution of the first continuous query, that a violation of a second SLA of the plurality of SLAs has occurred and, in accordance with determination of violation of the second SLA, output a second event indicating the violation of the second SLA;
      execute the at least one second continuous query on input events indicating violations of at least some of the plurality of SLAs including the first event and the second event;
      determine, as part of execution of the second continuous query and based on the first and second events, a relationship exists between the violation of the first SLA and the violation of the second SLA; and produce and output, in accordance with determination of the relationship between the violation of the first SLA and the violation of the second SLA, an event that indicates the relationship, wherein determination of the relationship between the violation of the first SLA and the violation of the second SLA is based on 1) temporal correlation of the violation of the first SLA and the violation of the second SLA; or 2) a defined dependency between the at least one distributed computing component associated with the violation of the first SLA and the at least one distributed computing component associated with the violation of the second SLA, wherein the first event and/or the second event comprise(s) data about the time when the corresponding violation was detected, which violation occurred, and/or measured values.

2. The monitoring system of claim 1, wherein the descriptions of the plurality of computing components in the registry comprise relationship information indicating a dependency between two computing components of the plurality of computing components.

3. The monitoring system of claim 2, wherein the at least one performance requirement for the first SLA specifies performance for a single call of the associated computing component and wherein the first event indicates violation of the single call.

4. The monitoring system of claim 2, wherein the at least one performance requirement for the first SLA specifies performance for multiple calls of the associated computing component and wherein the first event indicates violation of the requirement for performance for multiple calls.

5. The monitoring system of claim 1, wherein the at least one performance requirement is indicative of response time, availability, processing time, reliability, and/or throughput.

6. The monitoring system of claim 1, wherein the at least one computing component is a service, a web service, an infrastructure component, and/or a database.

7. The monitoring system of claim 1, wherein the compiler is configured to generate the first and/or the second continuous query when a lifecycle state of at least one associated SLA is set to productive.

8. The monitoring system of claim 1, wherein each one of the plurality of SLAs comprises one or more service level objectives (SLOs) and wherein the compiler is configured to generate a continuous query for each SLO.

9. The monitoring system of claim 1, wherein the first SLA specifies at least one required action to be performed upon detection of an SLA violation.

10. The monitoring system of claim 1, further comprising a graphical user interface configured to enable a user to modify the information stored in the registry.

11. A method for monitoring operation of a plurality of distributed computing components, the method comprising:

storing (a) descriptions of the plurality of computing components and (b) a plurality of service-level agreements (SLAs) where each one of the plurality of SLAs specifies at least one performance requirement for at least one of the plurality of distributed computing components;

generating at least a first and a second continuous query based on the information stored in the registry;

executing the first continuous query on input events indicating actions performed by the plurality of distributed computing components and corresponding performance information;

determining, as part of execution of the first continuous query, that a violation of a first SLA of the plurality of SLAs has occurred and, in accordance with determination of violation of the first SLA, output a first event indicating the violation of the first SLA;

determining, as part of execution of the first continuous query, that a violation of a second SLA of the plurality of SLAs has occurred and, in accordance with determination of violation of the second SLA, output a second event indicating the violation of the second SLA;

executing, in connection with at least one processor, the at least one second continuous query on input events indicating violations of at least some of the plurality of SLAs including the first event and the second event;

determining, as part of execution of the second continuous query and based on the first and second events, a relationship exists between the violation of the first SLA and the violation of the second SLA; and producing and outputting, in accordance with determination of the relationship between the violation of the first SLA and the violation of the second SLA, an event that indicates the relationship, wherein determination of the relationship between the violation of the first SLA and the violation of the second SLA is based on 1) temporal correlation of the violation of the first SLA and the violation of the second SLA; or 2) a defined dependency between the at least one distributed computing component associated with the violation of the first SLA and the at least one distributed computing component associated with the violation of the second SLA, wherein the first event and/or the second event comprise(s) data about the time when the corresponding violation was detected, which violation occurred, and/or measured values.

12. The method of claim 11, wherein the descriptions of the plurality of computing components in the registry comprise relationship information indicating a dependency between two computing components of the plurality of computing components.

13. The method of claim 12, wherein the at least one performance requirement for the first SLA specifies performance for a single call of the associated computing component and wherein the first event indicates violation of the single call.

14. A non-transitory computer readable storage medium tangibly storing a computer program comprising instructions for implementing a method in accordance with claim 11.

15. The monitoring system of claim 3, wherein the at least one performance requirement for the first SLA specifies performance for multiple calls of the associated computing component and wherein the first event indicates violation of the requirement for performance for multiple calls.

* * * * *